(12) United States Patent
Froloff et al.

(10) Patent No.: US 7,177,751 B2
(45) Date of Patent: Feb. 13, 2007

(54) AIR-HYBRID AND UTILITY ENGINE

(76) Inventors: Walt Froloff, 273 Searidge Rd., Aptos, CA (US) 95003; Kenneth C. Miller, 402 W. Seaclif Dr., Aptos, CA (US) 95003

( * ) Notice: Subject to any disclaimer, the term of this patent is extended or adjusted under 35 U.S.C. 154(b) by 0 days.

(21) Appl. No.: 11/257,800

(22) Filed: Oct. 25, 2005

(65) Prior Publication Data
US 2006/0052930 A1 Mar. 9, 2006

Related U.S. Application Data

(62) Division of application No. 10/780,410, filed on Feb. 17, 2004, now Pat. No. 7,050,900.

(51) Int. Cl.
*G06F 19/00* (2006.01)
*F02M 51/00* (2006.01)

(52) U.S. Cl. .................. 701/102; 123/480; 701/103

(58) Field of Classification Search ........ 701/101–105, 701/112; 123/321, 322, 406.47, 436, 480, 123/90.15
See application file for complete search history.

(56) References Cited

U.S. PATENT DOCUMENTS 5,460,129 A * 10/1995 Miller et al. ............. 123/90.15
6,016,794 A * 1/2000 Hashimoto et al. ......... 123/675
6,598,468 B2 * 7/2003 Zur Loye et al. .......... 73/117.3
2003/0010101 A1 * 1/2003 Zur Loye et al. ............ 73/116
2003/0051465 A1 * 3/2003 Kolmanovsky et al. ....... 60/285
2004/0163629 A1 * 8/2004 Strayer et al. .............. 123/491

* cited by examiner

*Primary Examiner*—John T. Kwon
(74) *Attorney, Agent, or Firm*—Walt Froloff

(57) ABSTRACT

A dynamically re-configurable multi-stroke internal combustion engine, comprised of programmable computer processor controlled engine components for decoupling the four classic strokes of an internal combustion engine and electronically managing engine cylinder components including such cylinder components as electronically controllable valves, fuel injection and air fuel mixture ignition, allowing additional engine cylinder unit component states and thus cylinder strokes to be independently altered or re-sequenced by computer control to provide alternate engine modes of operation. Some alternate engine modes are facilitated by addition of a compressed air storage reservoir to receive cylinder generated compressed air or transfer compressed air to cylinder units in other modes to increase engine power, efficiency or utility. Sensor input and on-demand requirements drive control logic to manage engine strokes through control of individual cylinder component states. Dynamic reconfiguration of individual component states provides re-generative engine energy modes, boost power modes, and mixed modes which use compressed air stored energy re-introduced for alternate cylinder state sequences and alternate engine modes of operation which add utility and efficiency to otherwise fixed sequence multi-stroke power generation in internal combustion engines.

6 Claims, 14 Drawing Sheets

Power Mode - Timing Diagram

FIG. 5 Compression Braking Mode - Timing Diagram

Boost Power Mode - Timing Diagram

Compression Start Mode and Compression Idle Mode - Timing Diagram

Re-Generative Compression Braking Mode - Timing Diagram

AIR-HYBRID AND UTILITY ENGINE

REFERENCES TO RELATED APPLICATIONS

This application is a Divisional to U.S. patent application Ser. No. 20050182553, Ser. No. 10/780,410 filed on Feb. 17, 2004, now U.S. Pat. No. 7,050,900, and which is incorporated herein by reference in its entirety with the exception of the claims.

BACKGROUND OF THE INVENTION

1. Field of the Invention

The field of the present invention relates in general to the fields of internal combustion engines and alternate mechanical utilities such as compressors, siphons, and air-engines. More particularly, the field of the invention relates to a dynamically reconfigurable multi-stroke computer programmable internal combustion engine with selectable cylinder component states, stroke sequences and changable cylinder firing order. The dynamically reconfigurable nature of the engine facilitates additional modes of operation that include compressed air production and storage, compressed air boost power, air compression braking, compressed air engine start, compressed air engine idle, suction and combinations of these and other modes of operation.

2. Background

The internal combustion engine has seen thousands of improvements and developments. Some of the latest improvements include fuel efficiency, pollution reduction, electronic ignition, fuel mixture heating or cooling, fuel injection, variable displacement, air-fuel mixing and digital controlling of hydraulically actuated intake/exhaust valves. Camless hydraulically driven intake and exhaust valves and electronically controlled hydraulic fuel injectors are among the very latest innovations to impact internal combustion engines.

A computer processor that provides commands to electronic assemblies can finely control and vary valve actuation, fuel injection and ignition. Electronic assemblies process commands and feedback signals from these devices to manage engine operation. Camless valve control allows engine control subsystems to vary timing, lift, and compression ratio in response to engine load, temperature, fuel/air mix, and other factors. The electronic valve-control system improves performance while reducing emissions.

There are several methods of camless valve control. Sturman, U.S. Pat. No. 6,360,728 Control Module for controlling hydraulically actuated intake/exhaust valves and fuel injection, claim fast-acting electro-hydraulic actuators which provide mechanical means for valve actuation under the control of an electronic assembly. Solenoid actuated two-way spool valves can also be actuated by digital pulses provided by an electronic assembly. Camless technology brings the internal combustion engine under even more electronic control potential and away from inflexible mechanical controls.

There have been attempts to build engines that have variable displacement, using maximum displacement for high load requirements and switching to a lower displacement for lower power needs. These methods for variable power requirements have been tried and so far not met with great success.

Despite all the innovation, the internal combustion engine mindset is still, in the vast majority, a basic four-stroke engine. Thus, the past and current technologies are all focused on operation efficiency and improvement of a basic four-stroke internal combustion engine that operates strictly on the intake-compression-power-exhaust cycle. The internal combustion engine has four basic functions that correspond with each stroke; suction, compression, power, and exhaust. Engines that can take advantage of alternate stoke sequences and operation modes are needed, which would produce higher economies of operation, lower pollution emission, reduce add-on components and allow alternate utility of applicable uses.

Camshaft Constraints

Engine camshafts are typically permanently synchronized with the engine's crankshaft so that they operate the valves at a specific point in each cycle. Efforts to work around camshaft constraints have come in many forms, including variable-cam timing mechanisms. Variable-cam timing allows the valves to be operated at different points in the cycle, to provide performance that is precisely tailored to the engine's specific speed and load at that moment. If conditions require earlier valve opening and closing, for example, to achieve more low speed torque, the control logic commands solenoids to alter oil flow within the hydraulic cam timing mechanism, which rotates the camshafts slightly. If the valves should open later, to generate more high-speed power, the mechanism retards the cams as needed. However, the cam timing is moved forward or backward for all the cylinders on the cam-shaft, solidifying the dependences and constraints between cylinders. Furthermore, with limited exceptions, camshaft-using engines are constrained to the classic four-stroke internal combustion engine cycle.

Variable displacement engines are designed with camshafts of slightly different forms to add the option to effectively reduce or increase engine power by taking cylinders off and on power line respectively to follow power requirements and minimize waste. What are needed are ways to add more flexibility in internal combustion engines such that independent control of valve states and stroke sequences per cylinder unit can be achieved.

Turbochargers and Superchargers

Turbocharge and supercharge power boost systems for internal combustion engines compress intake air by exhaust turbo boosters or belt-driven blowers. They compress intake air to higher than atmospheric air pressure to increase oxygen density in the fuel mixture and thus increase fuel burn power. A turbocharger is an engine add-on, which generally comprises a pair of turbines mounted to a common shaft. One turbine is a drive turbine disposed in an exhaust flow path, while the other turbine is a compressor turbine disposed, conventionally into the intake flow path.

Turbochargers use engine exhaust gases discharged by the combustion chambers moving across the exhaust turbine to rotate it and the intake turbine thereby compressing gases in the fuel air mixture. This compression permits an increase in the amount of air introduced into each cylinder during the intake stroke of its piston while maintaining a desired fuel/air ratio, to produce an attendant increase in the engine's power output. Essentially, the turbocharger converts exhaust mechanical energy into compressed intake air with higher oxygen concentration.

Although these methods can increase an engine's power output, turbochargers have many deficiencies. At some operating points, turbochargers become unstable. A low RPM engine gives little exhaust flow to drive the turbine and high vacuum manifold conditions cause a reverse pressure differential in airflow through the compressor side that applies rotational forces to the compressor blade in opposition to the drive turbine. Thus, when exhaust flow is relatively low, the airflow-produced forces may be sufficient to cause reverse rotation of the compressor that renders a turbocharger inoperative. Most turbochargers do not engage until much higher than three thousand engine RPM for these reasons. In addition, the turbocharger is load following in that power must first be expended to produce exhaust that can advantageously turn the compressor. Turbocharger power is low or non-existent at low engine RPM and is ineffective in response to short stop-go engine driving because of these deficiencies. Turbos are useful when extra power is needed at high engine RPM. What is needed is a source of compressed air, enriched in oxygen, for engine power requirements that are not dependant on engine output but instead, independently feed compressed air into engine cylinders on demand.

U.S. Pat. No. 6,141,965, Charge air systems for four-cycle internal combustion engines, attempts to remedy some of the turbocharger deficiencies by compressing air with a small electric motor for engine RPM below 2500, a region where most turbochargers are ineffective, then switching to essentially classical turbo compression beyond 2500 RPM. This shows that there is a need for compressed air at lower engine RPM but the cost currently is an additional electric motor, complex conduit connections and an additional complexity in the control system. What is needed is a source of engine compressed air with settable engine speed independent compressed air densities, with minimal high maintenance add-on parts and unnecessary system complexity.

A supercharger develops high-density intake air by separately compressing intake air with the use of a rapidly spinning rotor that acts as a positive displacement air pump. Although these provide large increases in power and torque, the blowers drain energy from the engine crankshaft and generate high crankshaft friction losses that result in poor fuel economy.

Turbo boosters and superchargers are separate engine component add-ons that also add weight, unreliability and cost to engines. What is needed are methods that do not add complex components, maintenance costs or add disproportionately larger costs to vehicle engines than the benefits that they provide. What is needed are charged air sources which can provide extra boost power on driver demand regardless of engine RPM.

Compression Braking

Vehicles typically use friction brakes that throw away energy in the form of heat. Also, brake usage is not uniform. For a fully loaded truck, a full stop from 60 mph might raise brake drum temperatures to 600 degrees F. This is about the limit for safe operation. If the brakes are not well maintained, or the load is not distributed properly, then some brake drums might go to 800–1000 degrees F., which is dangerous. What is needed is a braking system to augment a friction braking system to reduce risk at peak brake use periods.

In order to compensate and reduce brake wear, drivers gear down the vehicle transmission, increasing the engine RPM, thus allowing the engine to perform work by suctioning air. Although effective in deceleration, this method wastes valuable energy in the form of suctioned air that cannot be used in power mode and heating while spinning up lower gears. However, the currently unchangeable four-stroke engine cycle prevents any further practical use of this wasted energy.

Many large diesel trucks and some larger RVs are equipped with "Jake Brakes," also known as compression release engine braking systems. The basic idea behind a Jake Brake is to use the engine to provide additional braking power. A Jake Brake turns the engine into an air compressor to provide a great deal more braking power. Compressing the air in the cylinder takes power when the engine goes through a compression stroke.

A Jake Brake modifies the timing on the exhaust valves so that, when braking is desired, the exhaust valves open as the piston reaches the top of the compression stroke. The energy gathered in the compressed air is released, so the compression stroke actually provides engine braking power. The main advantage of a Jake Brake is that it saves wear on the normal brakes. This is especially important on long downhill stretches where brake shoes and linings can heat up in excess of 800 degrees F. The lasting disadvantage is that all of the compressed air that was used to brake is thrown away. What is needed are ways to store and reuse the compressed air thrown away in compression braking mode.

Intake Stroke

Much vehicle engine power is wasted in stop and go driving, an unwanted consequence of road and traffic conditions. During some of this time, drivers downshift transmissions to slow vehicles. If downshifted to provide braking, engine drawing in of intake air is used to slow the vehicle. Thus the intake stroke of the four-stroke engine has a braking feature while producing vacuum. However, the suction work produced by the engine is promptly thrown away. What is needed are ways to harness that wasted suction power.

Re-Generative Braking

Some statistics indicate that 40% of engine power generated is eventually lost through braking. What is needed are regenerative braking systems which act to effectively brake a vehicle while incorporating methods to store and recover braking energy. What is needed are modes of engine operation that could produce, store and accumulate energy for later use.

Typically, brakes expend much more energy and more quickly than today's four-stroke engines can produce in terms of real-time engine braking. Re-generative flywheel approaches include such concepts as U.S. Pat. No. 4,171,029—Vehicle propulsion system with inertial storage, but the applications are generally not economically practical from added large costs and complexity above their utility values. What is needed are engines that can substantially slow a vehicle down without applying irreversible energy loss during frictional braking. What is needed are practical and economic methods of slowing a vehicle down by converting a vehicle's kinetic energy reversibly into potential energy. This would result in the capability of slowing a vehicle down, storing energy instead of losing energy through irreversible processes, and re-using the energy.

Vehicle Dependence on Battery

Most vehicles make heavy use of stored energy from a battery to start the engine. Other stored energy methods can be used to start an engine. Taking vehicle momentum, usually from an incline advantage, and turning the engine over without a starter motor can start most standard transmission vehicles. Along this fashion, compressed air can function as an alternate source of stored energy, which can, with the correct engine cycle configuration, be used to turn the engine crankshaft to start the engine. An engine with this capability would be more efficient due to the smaller energy conversion losses currently encountered from converting mechanical energy of the engine to electrical energy and back to mechanical starter motor energy. Further more, at engine start, the starting motor draws the largest single demand on the car battery without which a smaller battery may suffice. An alternative method of starting an internal combustion engine also adds reliability, and therefore value.

Hybrid Vehicles

Due to demands for more efficient engines, today's vehicle market is experiencing bifurcation from the typical four-stroke internal combustion engine to hybrid engines. Hybrids use electric motors and battery banks to improve fuel efficiency, adding power during acceleration and reclaiming energy when braking and coasting. Hybrid engines do not come without a price as the electric motors and battery banks add weight and cost to the vehicle, and generally reduce the size and therefore available power the of engine. In fact, most hybrid auto manufactures are still selling hybrids at a loss. What is needed are hybrid type engines that do not add weight and the cost of large, heavy battery banks, electrical generators and motors. Moreover, what is needed are hybrids that do not force engines to be smaller and lower power in order to be more efficient. Furthermore, what is also needed are hybrids that do not have conversion losses from engine power to electrical power and back from electrical power to mechanical power. What is needed are hybrids that transfer mechanical engine energy or vehicle momentum to recoverable energy forms which can be quickly re-introduced for engine or external uses, thus further extending the energy produced from combustion. While hybrids are a good future option to increase energy efficiency, what is needed are alternatives to the current single option, the electric-combustion hybrid engine.

Hydrogen Powered Vehicles

Some auto industry experts proclaim hydrogen will be the next fuel used to power vehicles and some car manufactures have built model hydrogen fueled cars. These have come in two very different technologies. One way is a hydrogen fuel cell electric vehicle. The other method is to use hydrogen to fuel an internal combustion engine. Here the hydrogen is combusted with oxygen to generate power, hence turbo and super charging increases engine power and idle engine strokes wastes fuel. Innovations to the internal combustion engine will be directly applicable to hydrogen fueled internal combustion engines of the future. A new Ford model hydrogen fueled internal combustion engine is optimized to burn hydrogen through the use of high-compression pistons, fuel injectors designed specifically for hydrogen gas, a coil-on-plug ignition system, an electronic throttle, and new engine management software. This engine requires supercharging, which provides nearly 15 psi of boost on demand, but the engine is claimed to be up to 25 percent more fuel-efficient than a typical gasoline engine. Much work is ongoing in this area and there is a continuing need to improve internal combustion engine performance, increase engine utility and efficiency while reducing engine waste and pollution.

Air Powered Engines and Idle

Vehicle numbers and traffic increases have substantially increased the time of even short distance travel. Furthermore, internal combustion engines typically remain in idle mode while the vehicle is waiting for stoplights, coasting, stalled in traffic, etc. The idle mode is fuel wasteful as any power is only used for keeping the engine crankshaft rotating so that flywheel rotation energy is preserved. An incline, or available compressed air source can serve the same function without use of more fuel. What is needed are ways to keep the engine crankshaft rotating during idle periods without additional fuel costs.

Currently, most engines use fixed mechanical cams to open and close valves. Fixed mechanical cams enforce a rigid valve opening and closing timing sequence regardless of external conditions and circumstance. For this reason, when power is not needed such as in low speed or halted traffic conditions, engine power is wasted by cylinder strokes working to draw in, compress, combust fuel and vent exhaust. This power is thrown out as a small waste that is not cost effective to harvest. Based on the current engine design, this is probably a good approach. What is needed are methods to use those small individual quantities of engine-produced compressed air that is otherwise discarded.

However impractical for most engine uses, U.S. Pat. No. 5,515,675 Apparatus to convert a four-stroke internal combustion engine to a two-stroke pneumatically powered engine demonstrates an attempt to use compressed air to power an engine. '675 is not an internal combustion engine but a pneumatic engine which consumes compressed air to push engine pistons in its single operating mode to turn a crankshaft. First, the compressing air source is an external artifice or contrivance outside of its engine cylinders. Second, the timing of valve opening and closing is done by a camshaft, substantially constraining the control of the valve states solely for application of compressed air to crankshaft power. And third, it employs a pneumatic distributor with a rotor which opens gate valves to supply compressed air to the cylinders, further precluding operation of any other engine modes save engine crankshaft power from compressed air.

In another invention using compressed air to power an engine, U.S. Pat. No. 3,980,152 Air powered vehicle claims an engine powered by compressed air from a suspension type air compressor, where the air compressor is operatively connected between a vehicle's wheel and chassis harnessing the vertical movement of the wheel due to unevenness of the road. While powering engines with compressed air has been an environmentally laudable idea, no air-powered engines have reached a practical standalone design or seen adoption to internal combustion engines as hybrids. What is needed are air-powered engines that can be powered with compressed air or by burning an air-fuel mixture, thus saving fuel and reducing environmentally harming gases produced from internal combustion engines. What is also needed are ways to take currently engine-discarded compressed air and re-direct that to compressed air energy useful applications.

Other Vehicle Applications Using Compressed Air

Motor vehicle systems themselves need a source of compressed air to operate their air brakes, air suspensions, automatic maintained air pressure tires, conformable air seats, re-usable airbags, etc. Automatically maintained air pressure tire systems require a source of compressed air to keep tires inflated. Ways are needed to produce a compressed air source for the myriad applications driven by compressed air. Furthermore, vehicles and vehicle power plants have many potential pneumatic applications currently using electrical power such as starting motors, window opening-closing mechanisms, etc., pneumatic applications which can benefit from a readily available compressed air source.

Air Compressors

Air compressors use gas or electric motors to compress air. Commercial uses of compressed air from mobile sources for building, and street contractors are well known and extensively used by a growing building and construction industry. Usually, this requires an expensive and separate gas or electric powered mechanical unit be brought to the work site. These vary in power and air volume needs depending on the application.

Almost all tools today for private or commercial use are powered by either electrical or pneumatic power. The pneumatic tools require a compressed air source. Hundreds of vendors supply thousands of various designs and capacities of air compressors, pneumatic tools requiring various capacities of compressed air, pneumatic tool components and other portable pneumatic equipment. There is a growing market for pneumatic tools, which is predicated on some source of compressed air, mobile or stationary.

A market that continues to grow, as pneumatic applications grow, offers the need for air compressors of various power, size, and capacity. Air compressors are continually advancing in the reliability and utility that they provide. However, they do need to be leased or purchased as separate units. These compressed air sources are based on the size of the job and length of time needed. There are thousands of pneumatic tools for home, commercial and recreational uses. From small 5 CFM capacity hand paint sprayers to 110 CFM capacity air hammers, capacity for tools and needs differs, determining the size of the air compressor source required. Because their use and need is variable and job dependant, planning and investment must be made in order to make economical use of air compressors.

Private uses for pneumatic tools and applications have increased over the years. Today, home repairs and maintenance can require rental or purchase of air compressors for such applications as sand blasting or spray painting the family home. Garage and home tools are also prime candidates for pneumatic applications.

Currently, these pneumatic applications require an independent air compressor and air storage tank, which typically includes an electric motor-driven reciprocating piston that compresses air and stores the compressed air in a tank. Since the basic four-stroke internal combustion engine produces vacuum, compressed air, power and exhaust, what is needed is an engine that can be reconfigured dynamically such that engine cylinders can produce power, compressed air and vacuum in a re-usable form and on demand. What is needed are engines which produce and store compressed air for later engine re-use and or use in external applications where a ready source of compressed air is available without the extra effort, ad-on equipment and expense of an external compressed air source.

Suction Pumps

Suction pumps and siphon applications generally require specialized equipment be brought in to siphon or collect debris. Work places need to be cleaned and vacuum is a good mechanism to collect debris and work by-product. Suction pumps serve many useful purposes in cleaning up spills or siphoning flooded volumes. These require some independent device such as a motor to be obtained to collect or gather scattered matter or fluid from one place to another. Since one of the strokes of a four-stroke engine (commonly called intake stroke) acts to suction, what is needed are ways to convert a four-stroke engine into a suction device when needed.

Engine Utility

Much has been done to improve internal combustion engines but there is still untapped utility in an internal combustion engine. What is needed is a utility engine analogous to a utility vehicle. An internal combustion engine which can go off regular power mode and provide utility needed for more than just power, such as compressed air or vacuum for external applications is needed. Since the current internal combustion engine has four strokes, what is needed are ways to fully utilize all of those strokes in alternate ways to increase the internal combustion engines usefulness.

SUMMARY OF THE INVENTION

Internal combustion engines with electronically controlled engine components are programmed to operate individual engine cylinders with component states and stoke sequences that provide alternate modes of engine operation. In doing so, a dynamically re-configurable engine provides functions which are currently done with external devices, add-ons or energy wasteful engine functions in pursuit of engine power generation. By dynamically reconfiguring a multi-stroke internal combustion engine, it is possible to generate compressed air that can be used to increase the engine power and efficiency, used for various vehicle pneumatic applications, and used for external applications requiring compressed air.

The present invention discloses a dynamically re-configurable multi-stroke internal combustion engine, comprised of electronically programmable computer control system for decoupling the four classic strokes of an internal combustion engine and independently managing engine cylinder components including such engine components as electronically controllable valves, fuel injection and air fuel mixture ignition, allowing engine cylinder unit component states to be independently altered to change stoke sequences by electronic means to provide alternate engine operation modes. Some alternate engine modes are implemented by addition of a compressed air storage reservoir to receive cylinder unit compressed air or to transfer compressed air to cylinder units. Cylinder unit isolation from the compressed air storage reservoir is maintained through electronically controllable valves which meter compressed air into cylinders and compressed air out of cylinders. Sensor input and on-demand requirements drive control logic to manage engine strokes through control of individual cylinder component states. Dynamic reconfiguration of individual component states provides alternate engine modes of operation such as re-generative engine energy modes, boost power mode, and mixed modes, which add utility and efficiency to otherwise constrained four-stroke power generation internal combustion engines.

BRIEF DESCRIPTION OF THE DRAWINGS

These and other features and advantages of the present invention will become more apparent to those skilled in the art from the following detailed description in conjunction with the appended drawings in which.

DESCRIPTION OF THE PREFERRED EMBODIMENT

Figure 1:
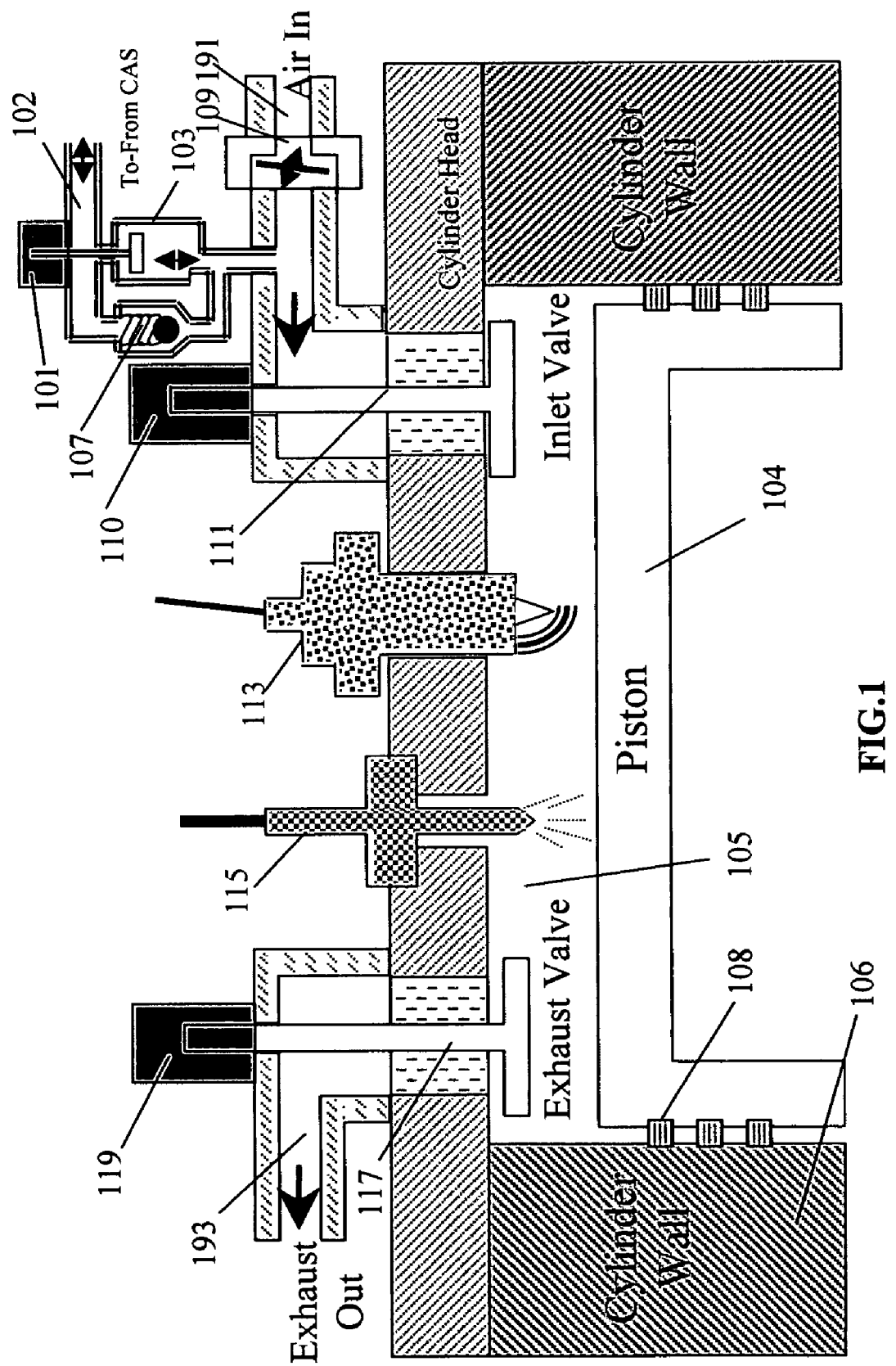
FIG. 1 is an engine cutout view illustrating a dynamically re-configurable internal combustion (DRIC) engine cylinder unit in accordance with an embodiment of the present invention.

Through decoupling and altering of cylinder component states and and stroke sequences, a multi-stroke internal combustion engine is created to perform any number of useful functions in addition to applying power to a crankshaft. With the combined advent of computer processors, electronic fuel injection, electronic ignition, and electronic intake and exhaust valve actuation in internal combustion engines, it is possible to electronically and independently control an internal combustion engine's fuel in, ignition timing, air in, exhaust out, and air-fuel mixture, independently and changeably in real-time to individual cylinders. Thus, by computer programmed control of these components, an aspect of the invention dynamically reconfigures an internal combustion engine's cycles for the purposes of creating alternate modes such as regenerative braking, power boost, compressed air engine start, engine fuel-less idle and general air compression or suction for internal or external use applications. These various engine modes are facilitated with the use of a compressed air storage reservoir operatively connected to the internal combustion engine to provide storage of engine produced compressed air. This compressed air can be re-introduced to the engine for modes such as engine power boost, engine idle, engine start or used for external compressed air applications currently requiring a separate and mobile air compressor.

An aspect of the present invention provides vehicle engine regenerative braking through programmed logic which determines the number of engine cylinder units, informed by various signals such as speed, rate of braking, descent incline angle, weight of vehicle, etc. to operate in air compression mode to decelerate the vehicle while storing up compressed air for alternate use. Compressed air from compression braking may be later re-introduced into engine cylinders for increased power demands such as for incline loads or for generally faster acceleration. This is accomplished by reconfiguring an internal combustion engine from a power cycle to a compression cycle at microprocessor speed, virtually in real-time. This allows an engine's power requirements and load functions to be altered dynamically to take full advantage of vehicle circumstantial momentum, inertial energy conditions and engine load requirements by re-configuring the operation of an engine.

Essentially, an aspect of the invention provides a programmable computer means for starting, transitioning and controlling individual cylinder units for selected modes of operation, wherein a mode is comprised of settable cylinder unit component states, sequences of strokes and computer programmed duty cycles. These modes of operation are selected from a set of modes further discussed below labeled power mode, compression start mode, re-generative compression brake mode, boost power mode, vacuum mode, compression idle mode, compressed air production mode, compression braking mode and combinations of these modes.

Dynamically Re-Configurable Internal Combustion (DRIC) Engine Basics

Figure 2:
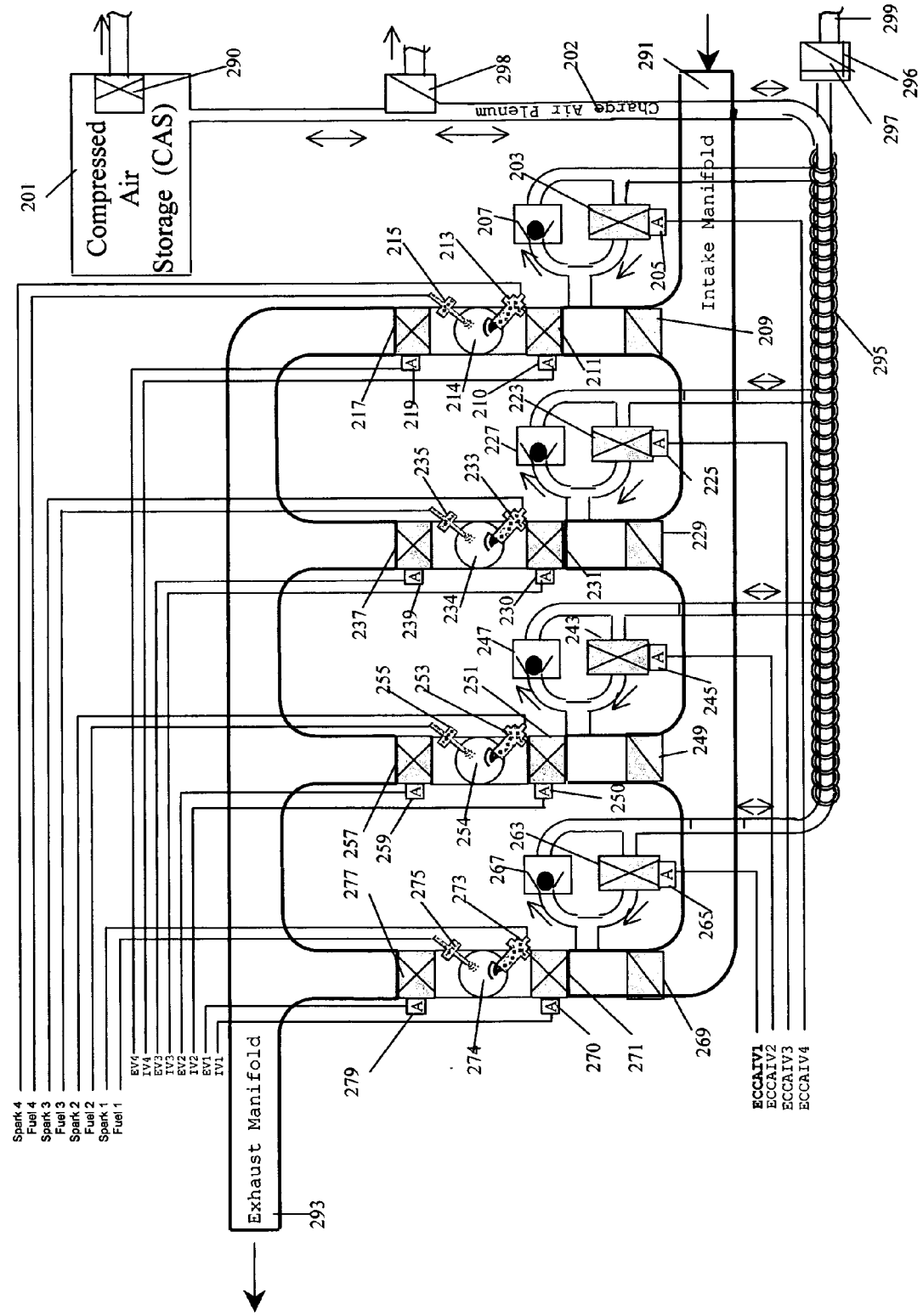
FIG. 2 is a high-level engine system diagram of a DRIC engine in accordance with an embodiment of the present invention.
Figure 3:
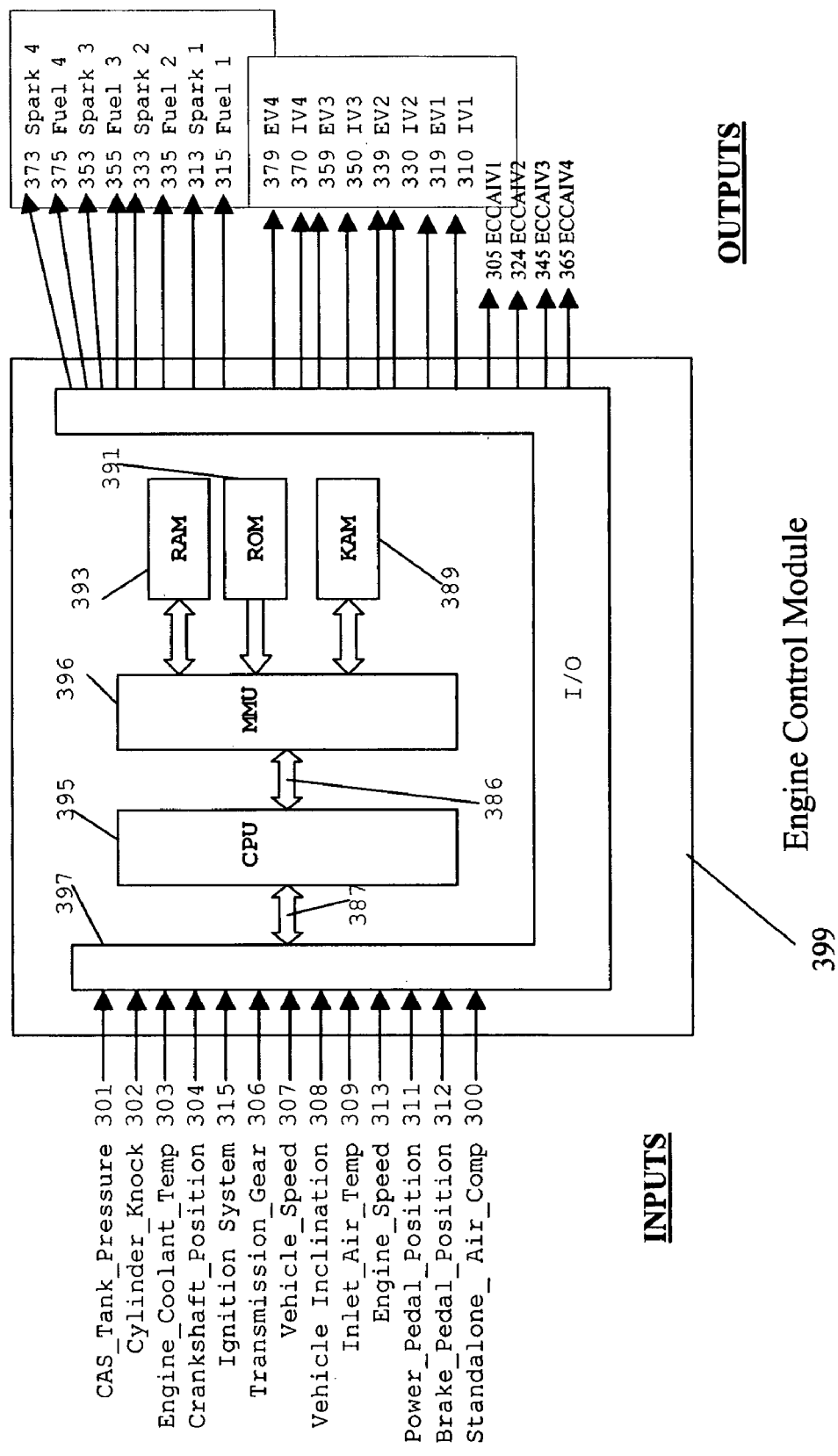
FIG. 3 shows a high level DRIC engine controller block diagram in accordance with an embodiment of the present invention.

FIG. 1 is a partial engine block cutout view illustrating a dynamically re-configurable internal combustion engine cylinder unit in accordance with an embodiment of the present invention. The cylinder 106, cylinder ring 108, piston 104, cylinder expandable volume 105, exhaust valve 117 and air inlet valves 111 and 109, fuel injector 115, fuel mixture igniter 113, compressed air inflow electronically controlled valve 103 and actuator 101, cylinder compressed air outflow check valve 107, air intake 191, exhaust manifold 193, compressed air reservoir 102, electronic actuation devices 110 119 comprise a Cylinder-Piston Compression-Power Unit (CPCPU) in a preferred embodiment. These components are independently operated under a computer control system. Specifically, a CPCPU is controlled by electronic fuel injection, electronic means for igniting a fuel air mixture, electronic means of controlling outlet and inlet valves, and fluid communication channels for compressed air from cylinder to compressed air reservoir and vice versa. Not shown if FIG. 1 but FIG. 2 and FIG. 3, are internal and external sensors under electronic control which take and deliver signals to cylinder components operating under programmable logic and processor control.

Other embodiments of the invention use piston-cylinder configurations such as in a rotary engine, where the cylinder is exchanged for a conformable volume which functions in similar fashion to rotate a crankshaft upon gas expansion. The present invention can be adapted to CPCPUs working in-line, opposed, vee, or radial configurations. Also not precluded from the present invention are non-spark ignition engine configurations such as diesel engines, which can be adapted as well even though compressed air with fuel mixture does not require electronic ignition for fuel mixture ignition.

Camless Electronically Controlled Inlet and Exhaust Valves

An aspect of the invention uses camless intake and exhaust valves under an electronic control system. Camless valves have only recently been commercially available. Valve motion can be effectuated electronically in two ways, solenoid actuation or fast-acting electro hydraulic. In one preferred embodiment of the DRIC engine, the inlet 111 and exhaust 117 valves use solenoid actuation 110 119 respectively. In another embodiment, a fast-acting electro hydraulic actuator under the control of an electronically controlled digital valve is used to provide the mechanical power for valve actuation. Engine inlet and outlet valves and associated electronic actuators are CPCPU specific components whose open-close states are controlled by a computer control system.

Fuel-Air Mixture Ignition

In an aspect of the invention, the fuel-air mixture ignition means depends on the type of four-stroke internal combustion engine. In a gas engine embodiment CPCPU, the fuel mixture igniter 113 receives a signal to ignite the fuel-air mixture in power mode generally near top dead center (TDC) of the power stroke. In this embodiment of the invention, a solid-state electronic ignition system is used in conjunction with electronic sensor signals and feedback signals to a central ignition module to produce a spark of a precise duration and time to a particular CPCPU in accordance with the engine mode and associated timing required. These are known to one skilled in the art and provide the means to introduce spark to ignite the air fuel mixture by computer control.

A diesel DRIC engine embodiment would, as in a diesel engine, produce a much higher compression and therefore a hotter compressed air for fuel mixing. Injecting fuel into a diesel CPCPU would, because of the high pressure, ignite the air-fuel mixture spontaneously. Therefore spark is not required to ignite the fuel-air mixture and reliance on fuel injection time to initiate power stroke would be used instead for a diesel DRIC embodiment. Since a diesel DRIC embodiment in boost mode introduces compressed air from CAS 102 via a valve into the combustion chamber of the CPCPU through the inlet valve 111, a compression stroke will increase the heat and pressure of the air mixture even more than in a typical diesel cycle, and therefore a denser air, which will burn additional fuel for additional power. A diesel engine embodiment can be programmed in boost power mode similar to the gas engine embodiment boost power mode but without the necessity of electronic ignition, but with reliance on fuel injection timing for air-fuel ignition from compressed air spontaneous combustion. This mechanism provides the ignition means component in a diesel DRIC engine embodiment.

Electronically Controllable Compressed Air Inlet Valves (ECCAIV)

The ECCAIV 103 is a solenoid valve under electronic processor control which commands the amount and density of air which will enter the cylinder volume 105 through the inlet valve 111 in accordance with selected duty cycles and modes. The ECCAIV 103 provides metered compressed air in power boost mode for a larger but stoichiometric burn, but also serves in other engine modes as required for compressed air needs. In other embodiments, the delivery of the required amount of air at a known density would be calculated based on processor input signals such as engine RPM and current power requirements and also such computer storage factors as mean effective pressure for the particular engine, compression ratio, mechanical efficiency, thermal efficiency, torque requirements, mode of engine operation, etc. Essentially, each CPCPU is isolated from stored compressed air reservoir by an electronically controllable valve capable of metering compressed air from CAS reservoir into cylinders. The ECCAIVs are also CPCPU specific components whose on-off states are programmably controlled by the computer control system.

Electronic Fuel Injection

Processor controlled fuel injection systems are currently designed and used by those skilled in the art for directing calculated fuel quantities to be injected into engine cylinders. In an aspect of the invention, based on input sensor information, engine mode, selected CPCPU, stroke and duty cycle logic information, the computer control system directs the fuel injector 115 to inject the calculated quantity of fuel at the time and for duration in accordance with a mode duty cycle based in part on fuel injector characteristic parameters, crankshaft position and engine speed. Although there are engine-operating conditions where air-fuel ratio requirements have priority over emission control, stoichiometric air-fuel ratios are thought to be the best for achieving both optimum fuel efficiency and optimum emission control under ideal conditions and are programmed into the fuel injection control logic. In an embodiment of the invention, processor control of the inlet air volume from ambient and compressed air sources and the fuel quantity entering the cylinder is maintained based on power demands without the dependence on ambient air density alone for fuel-air mixture. An aspect of the invention provides optimum air-fuel ratios that are not constrained by the air density from ambient air or from turbos because compressed air can be introduced in known quantities and pressures. Metered compressed air quantity from electronic control compressed air inlet valve ECCAIV 103 can be combined with metered fuel from the fuel injector 115 for selected CPCPU power at exact stoichiometric ratios. Since the source compressed air pressure is known from sensor data and the ECCAIV 103 characteristics are known, the compressed air and hence oxygen density can be calculated to meter precise quantities of air into the cylinder. Essentially, programmed computer logic controls fuel injector 115 component states in concert with ECCAIV 103 component states allow known pressure compressed air to flow through the ECCAIV 103 and calculated electronic fuel injector 115 fuel quantity based on injector characteristics, engine characteristics and digitized stoiciometry tables for a stoiciometric or other air-fuel mixture combustion. These are known to those of ordinary skill in the art.

Inlet Check Valve

The inlet check valve 109 provides a means of switching between a CPCPU receiving ambient air or compressed air. In another DRIC engine embodiment this means can take the form of an additional electronically actuated cylinder valve. In the FIG. 1 embodiment illustration, check valve 109 provides the means to prevent back-flow of compressed air. It also allows air from intake manifold 191 to flow to the cylinder volume 105 in normal power mode. In this embodiment of the invention, inlet airflow is controlled by local pressure conditions allowing one-way cylinder bound flow of ambient air from inlet manifold to the CPCPU. In other embodiments, the inlet check valve 109 can be controlled by electronic actuation for more optimal flow characteristics or alternate engine designs.

Compressed Air Storage Check Valve (CASCV)

In an embodiment of the invention, following a piston 104 compression stroke, in selected modes of operation, the CASCV 107 serves to allow compressed air to flow through the inlet valve 111 port to CAS plenum 102 for compressed air storage. In another embodiment, the compressed air to cylinder communication could take a more direct approach, routing directly to the cylinder through an additional electronically actuated cylinder valve. In yet another embodiment, the ECCAIV 103 and the CASCV 107 could be merged into a multi-way valve. Essentially, the compressed air storage reservoir is charged by one or more cylinder units via inlet valve 111 and CAS check valve 107 component open states. The CASCV allows compressed air to flow uni-directionally from cylinders into compressed air storage reservoir in accordance with a computer programmed mode of a particular CPCPU operation. The CASCV are CPCPU specific components whose operating states are, in this embodiment, controlled by local pressure conditions allowing one-way flow of compressed air from a CPCPU to the CAS.

This embodiment depicts a dynamically re-configurable multi stroke internal combustion engine coupled to the operation of a vehicle, comprising one or more cylinder units each with piston expanding and contracting cylinder volume. Each cylinder unit having an intake port and associated electronically controllable intake valve component, said intake valve component states under computer processor control. Each cylinder unit having an exhaust port and associated electronically controllable exhaust valve component, with the exhaust valve component states under computer processor control. Each cylinder unit having an electronic fuel injector component with the fuel injector component states under computer processor control. Each cylinder unit having an air-fuel mixture ignition means, with the ignition means under computer processor control. Each cylinder unit having a switching means for either expelling contracting cylinder volume compressed air for alternate use or for combusting compressed air-fuel mixture for power stroke with the switching means under computer processor control. A computer control system comprising one or more computer processors executing programming logic in accordance with mode defining cylinder unit component states, executing programming scenario logic responsive to sensor signals for changing cylinder unit component states in accordance with programmable select modes of operation such that the internal combustion engine cylinder unit component states are controlled to provide engine changeable cylinder unit stroke sequences generating crankshaft power or compressed air for alternate use.

Compressed air is a potential energy source where the compressed air provides a pressure differential to ambient air pressure that can be used for doing useful work. Compressed air alternate use is defined here as those compressed air applications not currently used in motor vehicles such as for compressed air production, regenerative compressed air braking, compressed air engine starts, compressed air engine idle, compressed air power boost and for external compressed air applications.

4-CPCPU DRIC Engine Embodiment

FIG. 2 is high-level diagram of a 4 CPCPU DRIC engine in accordance with an embodiment of the present invention. A four-stroke, intake-compression-power-exhaust, internal combustion engine functioning in four fundamental strokes when normally configured will deliver at least 4 effects; suction, compression, power and exhaust. By de-coupling the four stroke power cycle of some CPCPUs and re-configuring the cylinder valve component states of other CPCPUs, including such things as cessation of fuel injection and spark, an internal combustion engine can generate compressed air or vacuum for other applications. Compressed air storage 201 provides a reservoir for engine-produced compressed air. The CAS has a control valve 290 to regulate outside engine compressed air utility and also communicates with the engine through a charge air plenum 202.

In the invention embodiment shown in FIG. 2, cylinders receive intake air from ambient air manifold 291. In power mode, cylinders work under a firing sequence that is controlled by programmable control logic. This is notably distinguished from a preset unchangeable firing sequence constrained by mechanical design.

In a DRIC embodiment, CPCPUs are operated independently, but substantially similarly individually during a given operational mode. In a power mode utilizing all CPCPUs, intake air passes through inlet check valves 209 229 249 and 269 to the inlet valves 211 231 251 and 271 which are independently processor controlled through actuators 210 230 250 and 270 respectively. Inlet ambient air is mixed with fuel from injectors 215 235 255 275 respectively under processor control. The power stroke is initiated with the compressed air-fuel mixture ignited by processor-controlled ignition through spark initiators 213 233 253 and 273 respectively in accordance with a computer controlled firing sequence. This drives the pistons sequentially to impart rotational energy to the crankshaft for power. Exhaust valves 217 237 257 277 are independently processor controlled through actuators 219 239 259 and 279 respectively and are opened to vent exhaust gas to exhaust manifold 293.

In power boost modes, CPCPUs are independently isolated to accept manifold ambient air 291 through inlet check valves 209 229 249 and 269. CPCPUs independently processor controlled actuators 205 225 245 and 265 open and close ECCAIVs 203 223 243 and 263 respectively to supply compressed air from CAS 201 via the compressed air plenum 202 to the cylinders 217, 234, 254 and 274.

In engine modes which generate compressed air for storage, selected CPCPUs are independently controlled to generate compressed air. A CPCPU selected for air compression has fuel injector and spark ignition component states set to off and exhaust valves are closed for the duty cycle duration. The inlet valve is opened and inlet ambient air is drawn into cylinder on intake stroke. The CPCPU inlet valve is then closed for compression stroke after which the compressed air is expelled through the CAS check valves and through compressed air plenum 202 for cooling 295.

Compressed Air Storage (CAS)

The CAS 201 provides a means to store energy in the form of compressed air, which also serves as an accumulator for external applications of compressed air. The Compressed Air Plenum (CAP) 202 communicates compressed air from the CAS 201 through the ECCAIV 203, 223, 243, and 263, through the inlet valves 211, 231, 251, 271 respectively into the cylinders 217, 234, 254 and 274. The ECCAIV 203, 223, 242, and 263 and all inlet valve actuators 210, 230, 250, 270 are under computer processor control.

The CAS 201 can be a traditional high-pressure tank or non-traditional high-pressure container. Traditional high-pressure tanks have become lighter without sacrificing strength by using composite materials. Non-traditional CAS for vehicles can be in such volumes ordinarily not considered for high-pressure air containment such as hollow frames, high pressure tires, wall volumes, vehicle seats, etc. A series of containers connected with each other for a larger volume but isolated by valves, can effectively offer accumulation of maximum pressure more quickly without sacrificing available total storage volume. Vehicle tires can be manufactured of strength and thickness to be used as CAS reservoirs. Compressed air vehicle compartments and vehicle structural components used for CAS may also benefit from internal compressed air by adding strength and stiffness to members.

In another embodiment, the compressed air can have a transient storage life in a CPCPU compressed air distribution manifold, whereby compressed air produced in one CPCPU can be communicated to another CPCPU, thereby "turbocharging" other cylinders with enriched air without the use of a turbocharger. The compressed air distribution and manifold can be a connecting labyrinth with valves or a distributor directly channeling transient compressed air communicating between source and sink CPCPU's at appropriate times.

Compressed Air Plenum (CAP) Inter-Cooling Loop

In accordance with the laws of physics, compressing air will also increase its' temperature. In an embodiment of the invention, the heated compressed air may be useful at certain engine temperatures but not in other embodiments. The embodiment shown in FIG. 2 applies a cooling fluid loop 295 on the compressed air plenum to keep CAS temperature within pre-set parameters. Compressing, and subsequently cooling air, depending on air humidity, yields water vapor condensate. The excess water condensate is channeled to a sump 296 and drain valve 297 for draining 299.

Compressed Air Storage Check Valves (CASCV)

CASCV 207, 227, 247 and 267 in an embodiment of the invention are typical check valves which insure uni-directional flow of compressed air along a path from the CPCPU cylinders 214 234 254 174 to CAS 201.

Engine Controller

Current model automobiles and trucks use multiple processors and some vehicles have thousands of lines of software code. There are many engine computer programming environments which those skilled in the art use to program aspects of the invention: the engine control system, stoiciometry tables in digitized logic, mode duty cycles program logic and various other program logic. The engine control system is comprised of input sensors, electronic control modules to process those input signals, and stored logic and which then signals mechanical actuators to convert output signals into physical action. A control module, referred to herein as computer or controller, can be comprised of such components as CPUs, controllers, micro controllers, processors, microprocessors, memory and/or other electronic hardware.

FIG. 3 shows engine control module 399 for an embodiment of the present invention for a DRIC engine on a vehicle and associated inputs and outputs from devices and sensors. As shown in FIG. 3, the engine control module 399 includes a computer or central processing unit (CPU) 395 in communication with computer readable storage devices 389, 391, and 393 via memory management unit (MMU) 396. The MMU 396 communicates data (including executable code instructions) to and from the CPU 395 and among the computer readable storage devices, which for example may include read-only memory (ROM) 391, random-access memory (RAM) 393, keep-alive memory (KAM) 389 and other memory devices required for volatile or non-volatile data storage, and data buses 387 386 of any suitable configuration. The computer readable storage devices may be implemented using any known memory devices such as programmable read-only memory (PROM's), electrically programmable read-only memory (EPROM's), electrically erasable PROM (EEPROM's), flash memory, or any other electrical, magnetic, optical or combination of memory devices capable of storing data, including executable code, used by the CPU 395 for controlling the internal combustion engine and/or motor vehicle containing the internal combustion engine.

Input/output (I/O) interface 397 is provided for communicating with various sensors, actuators and control circuits, including, but not limited to, the inputs shown in FIG. 3. These inputs include device and sensor signals such as CAS Tank Pressure 301, Cylinder Knock 302, Engine Coolant Temperature 303, Crankshaft Position 304, Ignition System 315, Transmission Gear 306, Vehicle Speed 307, Vehicle Inclination 308, Inlet Air temperature sensor 309, Engine Speed sensor 313, Power Pedal Position 311, Brake Pedal Position 312, and Air Compression Standalone 300. Input signals are used as real-time variables in conjunction with the programmed duty cycle and mode logic to control the CPCPU components in concert with cylinder unit piston position for creating variable stroke sequences.

The engine controller module 399 receives signals from a variety of sensors, such as the sensors discussed above, and controls operation of CPCPU components through outputs which control the states of the fuel injectors 315 335 355 375, Inlet Valves 310 330 350 370, Exhaust Valves 319 339 359 379, spark plugs 313 333 353 373, ECCA inlet valves 305 324 345 365 analogous to a FIG. 2 embodiment CPCPU components. These outputs include Spark_4 373, Fuel_4 375, Spark_3 353, Fuel_3 355, Spark_2 333, Fuel_2 335, Spark_1 313, Fuel_1 315, EV4 379, IV4 370, EV3 359, IV3 350, EV2 339, IV2 330, EV1 319, IV1 310, ECCAIV 305, ECCAIV2 324, ECCAIV3 345, ECCAIV4 365.

Where Spark_n represents the control line to the submodule ignition for cylinder n, Fuel_n represents the control line to actuator assembly fuel injector in cylinder n, EVn represents the control line to actuator assembly camless exhaust valve in cylinder n, IVn represents the control line to actuator assembly camless inlet valve for cylinder n, and ECCAIVn represents the control line to electronic control compressed air inlet valve serving cylinder n compressed air.

The control and operation of CPCPU component states varies in accordance with the mode requirements, sensor input and engine parameters. Although CPCPU embodiments of the invention are described with components as having Boolean states of open/closed or on/off, this is done for illustration of simple cycle of operation purposes. In practical fact, this would be an approximation and the physical reality of moving engine components, even though electronically controlled and actuated, is that components have state transition characteristics, properties and response profiles which impact the duty cycle timing. Optimum operational results may require initiating component state transitions before top dead center (TDC) or after TDC and in accordance with engine parameters. This would apply to bottom dead center (BDC) stroke starts as well. Valves and other mechanical components have characteristic open and close profiles. Latencies from command execution to completed mechanical state transition must be addressed in any real application of the invention. Therefore, the component open/close duty cycles and timing curves may appear substantially different from those illustrating the simple fundamental modes of operation which when implemented may appear different.

Sensors and devices provide information about vehicle operating parameters that affect the operation of the vehicle, the engine and engine mode of operation. The term "vehicle operating parameters" herein refers broadly to any vehicle operating parameter, including but not limited to engine operating parameters, which are sensed, computed, derived, inferred or otherwise provided.

The engine controller 399 is a portion of the computer control system which comprises computer readable program code embodied in a computer usable medium. The readable program is executable code and programmable logic embedded in various modules and sub-module component hardware. The programming and firmware embedment process is well known to those of ordinary skill in the art. The programmable portion will store engine mode information and control transition of the engine from one mode to another mode, or command that the engine operate in a mixed mode. Simple example computer program logic in the form of psudo code is shown below for engine mode transitions for typical vehicle operation.

In a present embodiment scenario; where the engine is in power mode operation, there is vehicle speed 307 in excess of 30 mph, engine speed 313 in excess of 1 K RPM and the rate of brake demand from brake pedal position 312 exceeds X brake_pedal_position. This combination of variables and vehicle parameters would signal a desire to stop or slow the vehicle. This typical driving scenario encountered by most drivers daily provides an opportunity to convert vehicle kinetic energy into potential energy in the form of compressed air, without wasting fuel while slowing the vehicle. In this scenario, the engine would be reconfigured to compress air by changing the states of the engine components, in compliance with a change in mode, to achieve the deceleration desired. Using sensor input variables in FIG. 3, and engine parameters in the logic, an engine control system psudo code snippet may be:

```
IF ((Power_Mode) AND (Vehicle_Speed > S1) AND (Engine_Speed
        > E1) AND (Power-Pedal_Position >B1)) THEN
{
    IF (CAS_Tank_Pressure > P1) AND (Brake Pedal Position > B2)
        Transition_to(Compression_Brake_Mode) ELSE
    {
        Transition_to(Re-Generative_Compression_Brake_Mode);
    }
}
```

Where S1, E1, B1, P1 and B2 are settable vehicle operating parameter constants for vehicle speed, engine speed, braking demand, CAS tank pressure and brake threshold values respectively. Transition_to(MODE) is a function which changes a CPCPU from a current mode to the mode designated by the input parameter. The transition would ensure that the piston stroke acts in concert with the component state changes such that the changes do not work at cross purpose with each other, but are synchronous to cylinder unit's piston position as sensed from crankshaft position. Thus once cylinder unit piston position at TDC is determined to occur, the cylinder unit component states are set in accordance with the target mode defined stroke sequence. In this scenario, the target modes would be Compression_Brake_Mode( ) and Re-generative_Compression_Brake_Mode( ), mode operations described in further discussion below.

Achieving a low enough engine speed 313 coupled with effectively zero power pedal position 311 allow the controller logic to determine the new power requirements in a simple model. In more complex embodiments power requirements would have more signal inputs such as incline angle, vehicle speed and or rate of power pedal position change. The output logic would signal the engine to reconfigure to compressed air idle mode and hence the individual cylinder units would set their component states in concert with their respective piston positions in accordance with the idle mode stroke sequence. The engine control system logic psudo code for this simple embodiment may appear as:

```
IF ((Engine_Speed < E2 ) AND (Power Pedal Position < D2)) THEN
    {
        Transition_to (Compressed_Air_Idle_Mode)( ) )
    }
```

Where E2 and D2 are settable engine_speed and Power_Pedal_Position threshold logic parameter constants.

Standalone Air Compression 300 mode signal will place the engine in a mixed power and air compression mode (if compressed air storage (CAS) Tank Pressure 301 is below a preset air storage pressure) to pump up the CAS pressure for alternate application use. In this scenario, CPCPU 1 and 2 and associated components will receive commands to maintain engine crankshaft rotation and CPCPU 3 and 4 will receive commands from the controller module 399 to run in air compression mode to re-pressurize the CAS. A sufficiently high CAS tank pressure 301 would signal cessation of the compression mode until such time as the CAS tank pressure 301 falls below a selected preset value, followed with a resumption of air compression mode. A psudo code snippet of this scenario is:

```
WHILE((Standalone_Air_Compression) AND
        (P3 < CAS_Tank_Pressure < P4)){
            Transition_to(Compression_Brake_Mode)
        }
```

Where P3 and P4 are settable pressure parameters, Standalone_Comp_Air 300 and CAS_Tank_Pressure 301 are sensor inputs in FIG. 3.

Thus the above scenarios illustrate an aspect of the invention which provides means to program external events or circumstances by way of vehicle operation parameters into engine controller response logic alternatives by adaptive means of altering engine operation modes changing engine configuration dynamically to manage external circumstances with reconfigured engine component state and stroke sequences.

In another embodiment, several input signals processed by the computer processor would be used to optimally control delay of spark to a cylinder relative to piston TDC. Aspects of the present invention would add such input signal information as CPCPU number, mode, stroke cycle, piston position, etc to the process. An aspect of the invention provides means for computer program alterable engine cylinder unit firing sequence where the spark initiator acts as a component of a specific CPCPU whose on-off states are computer controlled.

Engine component states necessary to establish the programmable means of controlling the modes and their associated component states and timing in concert with piston strokes are shown below under each individual engine mode.

Reconfigurable Operating Modes

In an aspect of the invention, an internal combustion engine with particular engine components under electronic control is re-configured to operate in modes and combinations of modes other than solely for producing power to turn the crankshaft. In addition to the power operation mode, a dynamically re-configurable internal combustion (DRIC)

engine can be designed to operate in compressed air production mode, boost power mode, compression brake mode, compression start mode, Compression idle mode, and combinations thereof. This not only increases the versatility of an internal combustion engine, it also allows for higher efficiencies, lower emissions and other benefits.

In addition to providing compressed air or vacuum for external applications, a re-configuration of engine mode results in energy gains under conditions that result in higher fuel efficiencies. A more precise air fuel mixture control capable of formulating any air-fuel ratio can be achieved with a more complete stoichiometric combustion because the numerator, air density, as well as the denominator, fuel quantity, are both controllable under programmed processor control. And thus a more responsive engine load following regime can be attained. Furthermore, precise fuel air mixture through introduction of engine produced compressed air at controlled air densities rather than by imprecise ambient or unregulated mechanically generated turbocharger compressed air densities can be achieved through programmable logic in an aspect of the invention. Powering an engine without consumption of fuel by re-introducing engine produced compressed air at the appropriate piston positions as in in an air driven piston motor can maintain engine RPM as required for vehicle idle.

Alternate Engine Modes

As briefly discussed above, aspects of the invention provide alternate engine modes. The alternate engine modes are discussed in conjunction with component duty cycle timing diagrams. The timing diagrams FIG. 4 through FIG. 8 show graphical depictions that only simply express the open-closed, on-off positions, pulse durations and duty cycles of each of the relevant engine components. These pulse durations and duty cycles can vary substantially within a mode's cycle to reach optimums or to comply with constraints. In idle mode, the engine idle RPM will differ for every vehicle in different environmental conditions and rates of obtaining and preserving a steady pre-set idle will be controlled by the processor by adjusting the CPCPU component states to apply the necessary component positions to achieve the preset idle RPM. Also, computer operation and control of the Inlet_Check_Valve 109 and CAS_Check_Valve 107 are unnecessary in an embodiment which employs a flapper or check valves which change state as a function of local pressure conditions automatically, as in this embodiment and associated modes of operation.

An embodiment of this invention includes sensors and inputs that provide information to processors, which are programmed to determine optimum open, close, on and off states for the components that comprise an engine. All optimizing calculations, variables and factors are not accounted for here because they are engine design specific, and we only present a simple fundamental mode of operation of an embodiment. Therefore, the component states, durations and profiles will vary for each engine according to its physical characteristics and that the instant invention is not limited by the modes and states presented here.

Power Mode

Figure 4:
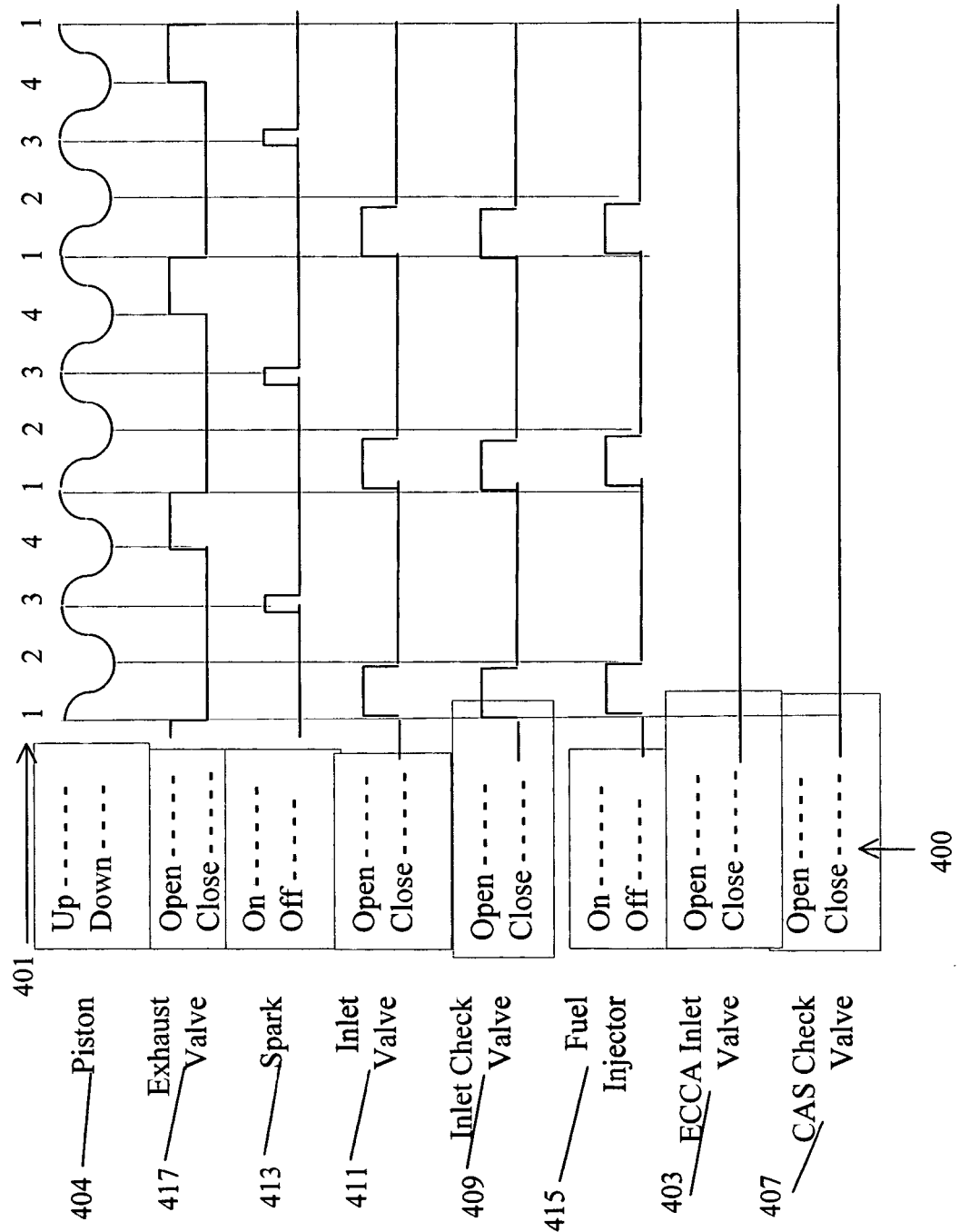
FIG. 4 is a timing diagram illustrating a Power Mode according to an embodiment of the present invention.

FIG. 4 is a timing diagram illustrating a Power Mode according to an embodiment of the present invention. FIG. 4 shows the state positions 400 and duty cycles corresponding to a CPCPU piston 404 stroke number 401, exhaust valve 417, spark 413, inlet valve 411, inlet check valve 409, fuel injector 415, ECCA inlet valve 403, CAS check valve 407 as a function of time during a 4 stroke cycle engine in accordance with one mode of the invention.

In internal combustion engines, the thermal gas expansion energy that is released when the fuel is burned is converted into mechanical energy. A combustible mixture of fuel and air are ignited in the cylinder that expands the gas and pushes the piston that imparts a torque to the crankshaft. The energy needed to effect the change of contents in the cylinder is provided by the flywheel, which stores up some of the mechanical energy imparted by the piston. The additional energy developed by the engine is used at the end of the crankshaft to provide power as required by CPCPU modes or engine load.

In an invention embodiment of a multi-stroke engine, the first stroke 401 1–2, intake stroke, the piston 404 travels from its effective smallest cylinder volume position, Top Dead Center (TDC), to it's effective largest cylinder volume position, Bottom Dead Center (BDC), by means of rotational power from the crankshaft. During this stroke the exhaust valve 417 components is in the closed state as the cylinder is temporarily isolated from the exhaust manifold. The inlet valve 411 and the inlet check valve 409 components are in the open state so that ambient air can be drawn into the cylinder. The fuel injector 415 injects fuel 400 which mixes with the introduced air from the inlet valve 411. The ECCA inlet valve 403 and the compressed air storage (CAS) check valve 407 are both in the closed state.

The second stroke 401 2, is the compression stroke. While all the cylinder valves 417 411 409 403 407 are closed, the piston 404 compresses the fuel-air mixture by moving from BTC to TDC.

The third stroke 401 3 is the power stroke. While all the cylinder valves 411 417 409 403 407 are closed, spark 413 ignites the compressed air-fuel mixture and the pressure of the gases of combustion forces the piston 404 to expand the cylinder volume and in doing so imparts rotational energy to the crankshaft.

The fourth stroke 401 4 is the exhaust stroke. The exhaust valve 417 is opened while all the other valves 411 409 403 407 remain closed and the piston 404 pushes the spent gas through the exhaust valve 417 clearing the cylinder and completing the cycle.

As above, each CPCPU has associated components which are identified by CPCPU and identifying number n of CPCPU as CPCPU_n. In the psudo code snippet below, the CPCPU_n is associated with ECCAIVn, IVn, EVn, Spark_n, Fuel_n, CASCVn, ICVn, corresponding to the electronic control compressed air inlet valve, inlet valve, exhaust valve, spark, fuel, CAS check valve, inlet check valve respectively for the nth CPCPU. The function Schedule_at( ) is program logic executed in real-time and relies on real-time sensor data as well as preset variables, constants and programmable logic to determine which CPCPU component states to adjust in accordance with applicable mode duty cycles and at the prescribed time. In the most basic fundamental mode, PISTON_TOP_OF_STROKE_$1^{st}$ will be the time at TDC for the CPCPU_N piston, which is based on a known crankshaft position to determine an individual CPCPU piston position as it will reach it's TDC. Component state durations will be based on engine speed (RPM), a real-time input parameter from sensor signals, and component specific characteristics, which determine constants and duty cycle durations. For example the inlet valve 411 duty cycles are depicted as relatively vertical step up and down with flat duration during the full stroke period. This is a simple ideal depiction made for demonstrative purposes, as current valve characteristics generally require that the valve be opened BTC and closing overlaping with other valve openings. Furthermore, the stroke time or cycle duration are based on engine speed and with other factors, used in calculating component state durations. An simple ideal psudo code snippet for power mode would be:

```
Power_Mode( CPCPU_N )
{
    Schedule_at( PISTON_TOP_OF_STROKE_1st, CPCPU_N)
    {
        Dispatch_Exhaust_Valve_Close(CPCPU_N);
        Dispatch_Inlet_Valve_Open(CPCPU_N, DT2);
        Dispatch_Fuel_Injection_On(CPCPU_N, DT3);
        Dispatch_ECCAIV_Close(CPCPU_N);
    }
    Schedule_at( PISTON_BOTTOM_OF_STROKE_2nd, CPCPU_N)
    {
        Dispatch_Inlet_Valve_Close(CPCPU_N);
        Dispatch_Fuel_Injection_OFF(CPCPU_N);
    }
    Schedule_at( PISTON_TOP_OF_STROKE_3rd, CPCPU_N)
    {
        Dispatch_Spark_Ignition(CPCPU_N);
    }
    Schedule_at( PISTON_BOTTOM_OF_STROKE_4th, CPCPU_N)
    {
        Dispatch_Exhaust_Valve_Open(CPCPU_N, DT1);
    }
}
```

Where DTx are the pulse width times roughly calculated

DT1=(Stoke/Rev)×(Fraction of EV stroke duty cycle)×(60)/(Engine_Speed)

DT2=(Stoke/Rev)×(Fraction of IV stroke duty cycle)×(60)/(Engine_Speed)

DT3=(Stoke/Rev)×(Const1)×(function(CAS_Pressure))/Engine_Speed)

Const1=ECCAIV property constant

Stroke/Rev=stroke period per crankshaft revolution

Engine_Speed=engine RPM input

In power mode, an aspect of the invention provides programmed computer control actuation of cylinder unit component states in conformity with programmed power mode duty cycles responsive to engine power demand requirements, engine RPM and cylinder unit piston position progress through intake, compression, power and exhaust strokes to provide the required power to the crankshaft. Component state duration times DT1, DT2, DT3 are determined by controller calculations in real-time from formulations based on vehicle operating parameters such as engine speed and CAS pressure, and also in accordance to duty cycle characteristics. Injector duration in open state, DT3, has a additional term which models the flow characteristics of the particular injector device and in this embodiment is only roughly based on pressure but will generally have many engineering characteristic parameters to be taken into account in calculations of optimal duration time. Here, the DT3 calculation is more representative of an ECCAIV open state duration calculation and is used here to illustrate the breath of calculation types contemplated in aspects of the invention. Further more, generally, these types of simple formulations and calculation methods are thus applied to other modes of operation in calculating component open or close state durations and are related in time to associated piston stroke sequences.

In power-generating modes, the engine firing order is changed by programming logic scheduling cylinder unit stroke sequences by setting select cylinder unit component states such that cylinder unit strokes sequence through intake-compression-power-exhaust independently of other cylinder units while maintaining cylinder unit volume expansion in concert with compatible crankshaft positions. Firing order may be changed to achieve various means and purposes such as mixed mode operation, transitioning CPC-PUs between modes, failure mitigation, engine vibration and other purposes.

Compression Braking Mode with Compressed Air Storage Tank Full

Figure 5:
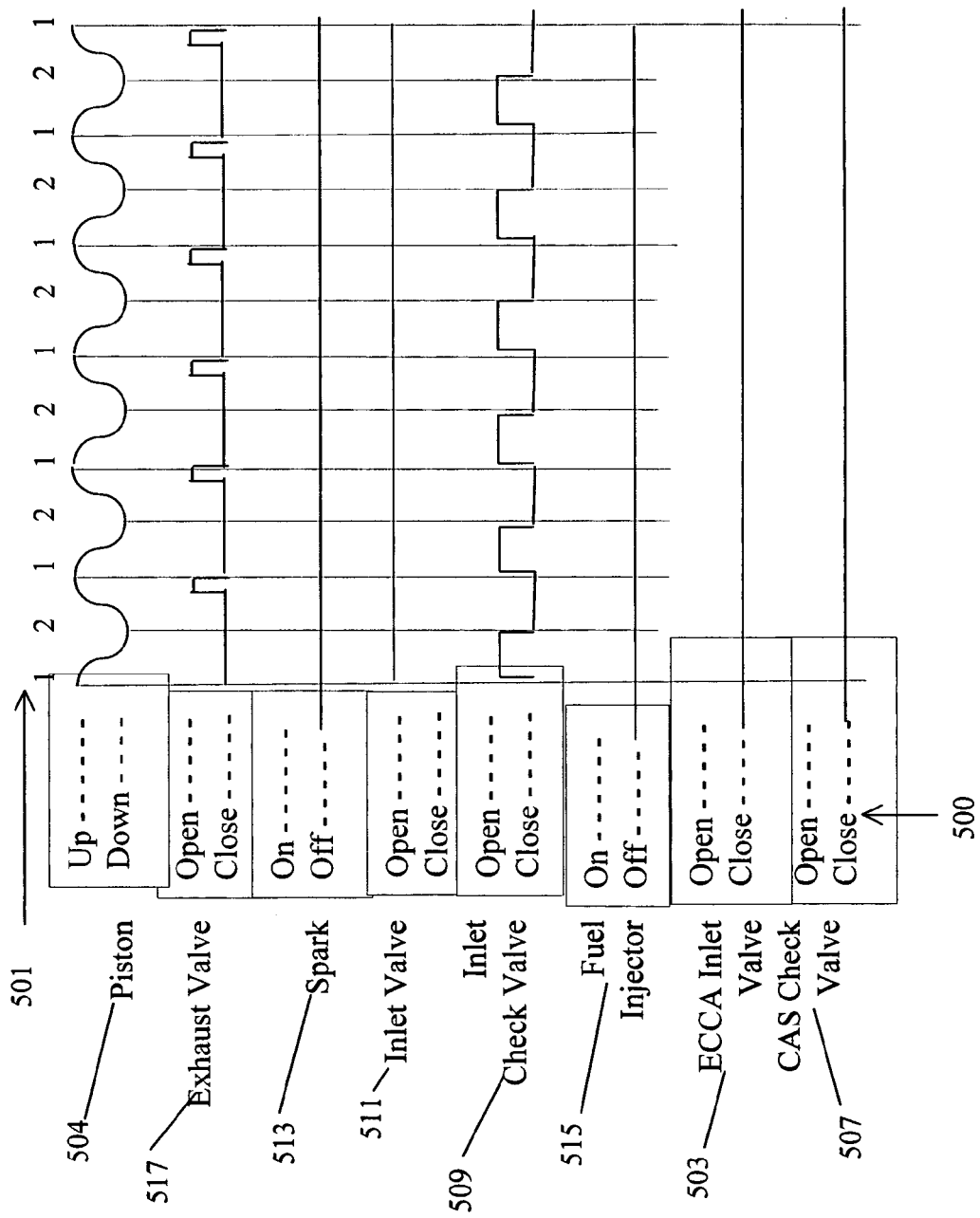
FIG. 5 is a timing diagram illustrating Compression Braking Mode according to an embodiment of the present invention.

FIG. 5 is a timing diagram illustrating Compression Braking Mode with Compressed Air Storage Tank Full according to an embodiment of the present invention. FIG. 5 shows the state positions 500 and duty cycles of a CPCPU piston 504, exhaust valve 517, spark 513, inlet valve 511, inlet check valve 509, fuel injector 515, ECCA inlet valve 503, CAS check valve 507 as a function of time during a two stroke cycle 501 in accordance with an aspect of the invention.

In brake mode, there is an immediate need for the engine to reverse the direction of power transmission from pistons to the crankshaft to from the crankshaft to pistons ie. the engine consumes vehicle or engine flywheel momentum to provide engine work or alternatively, power is taken from the crankshaft when the pistons do work compressing air. Since power and exhaust stroke are not used in this mode, the compression and intake strokes are all that are required to in this mode. Furthermore, if the CAS tank is full, the compressed air is vented through the exhaust manifold.

Beginning with an intake stroke when the piston 504 is at TDC of its stroke 501-1 heading towards cylinder volume expansion 501-2, exhaust valve 517 state is closed, no spark 513 is given, the inlet valve 511 and inlet check valve 509 are fully opened for ambient air which is drawn into the cylinder. During intake stroke 501-1, fuel injector 515 is turned off, ECCA inlet valve 503 and the CAS check valve 507 are closed. In compression stroke 501-2, spark 513, fuel injector 515 remain off, ECCA inlet valve 503 and CAS Check Valve 507 remain closed, Inlet valve (IV)511 and inlet check valve 509 are closed although inlet check valve 509 can remain open throughout this mode as well. Towards the tail end of the compression stroke 501-2 the exhaust valve (EV) 517 is opened for a short fraction of the duty cycle to vent compressed air to exhaust manifold. In another embodiment of the invention, regulated communication between CPCPUs intake manifolds can direct compressed air from a compression stroke of one CPCPU to the compression stroke of another CPCPU to multiply the compressed air pressure simultaneously, resulting in greater engine stopping power.

A simple exemplar psudo code snippet for programmable logic control of engine components establishing a compression mode for an individual CPCPU N is as follows:

```
Compression_Brake_Mode ( CPCPU_N )
{
    Schedule_at( PISTON_TOP_OF_STROKE_1st, CPCPU_N)
    {
        Dispatch_Exhaust_Valve_Close(CPCPU_N);
        Dispatch_Inlet_Valve_Open(CPCPU_N, DT2);
        Dispatch_Fuel_Injection_OFF(CPCPU_N);
        Dispatch_ECCAIV_Close(CPCPU_N);
    }
    Schedule_at( PISTON_BOTTOM_OF_STROKE_2nd, CPCPU_N)
    {
```

-continued

```
    Dispatch_Inlet_Valve_Close(CPCPU_N);
    Dispatch_Exhaust_Valve_Open_Period(CPCPU_N,DT3,DT4);
  }
}
DT2 = (Stoke/Rev)×(Fraction of IV stroke duty
   cycle)×(60)/(Engine_Speed)
DT3 = (Stoke/Rev)×( Fraction of compression stroke duty cycle
   closed)×(60)/(Engine_Speed)
DT4 = (Stoke/Rev)×( Fraction of compression stroke duty cycle
   opened)×(60)/(Engine_Speed)
Stroke/Rev = stroke period per crankshaft revolution
Engine_Speed = instantaneous engine speed FIG. 3, 310
Boost Power Mode
```

Figure 6:
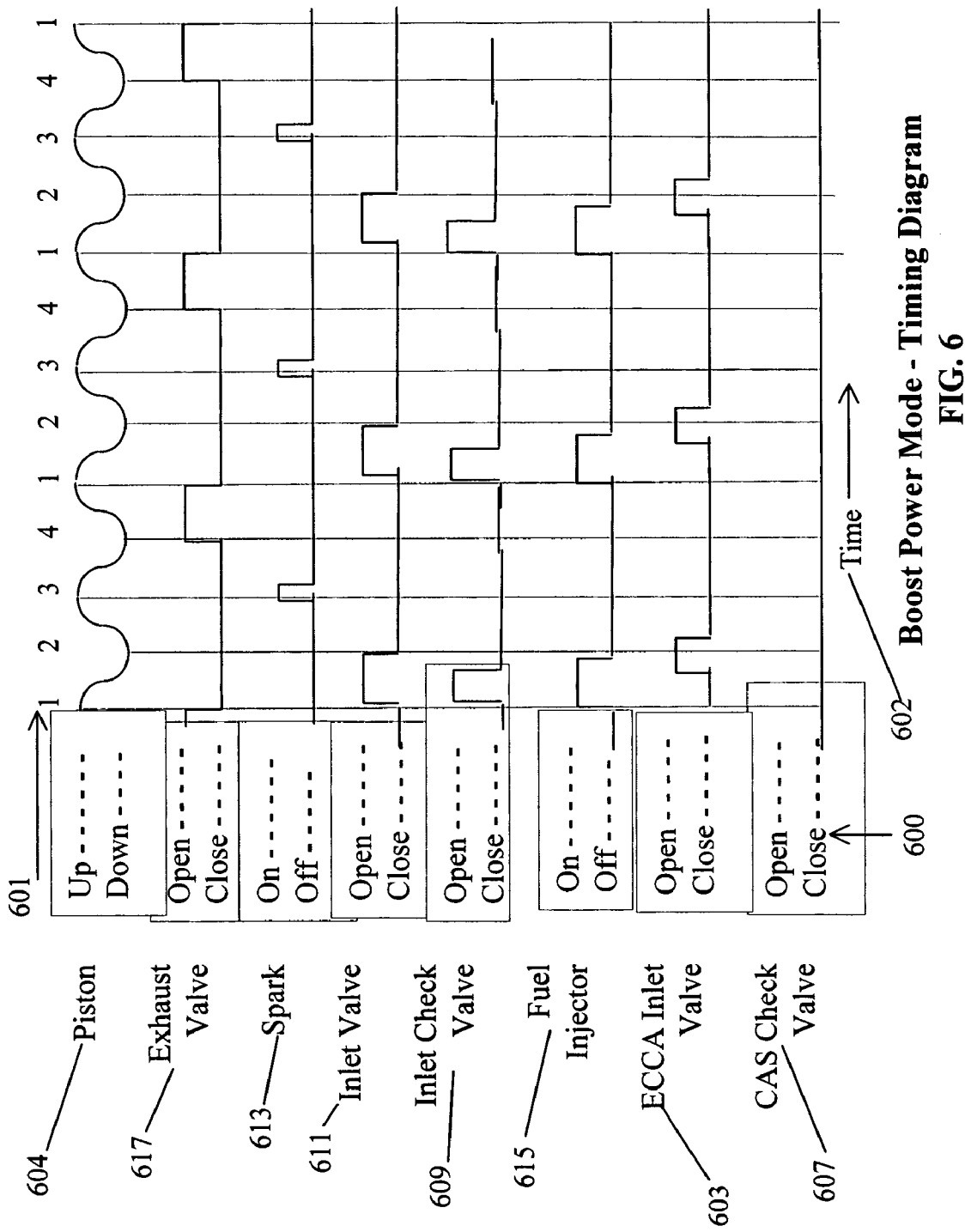
FIG. 6 is a timing diagram illustrating Boost Power Mode according to an embodiment of the present invention.

In Boost Power Mode, not unlike with turbocharged air, the engine is supplied oxygen rich compressed air instead of ambient air so that more fuel can be burned for a higher effective mean piston pressure and hence stronger power stroke. FIG. 6 is a timing diagram illustrating boost power mode according to an embodiment of the present invention. FIG. 6 shows the state positions 600 and duty cycles of a CPCPU piston 604, exhaust valve 617, spark 613, inlet valve 611, inlet check valve 609, fuel injector 615, ECCA inlet valve 603, CAS check valve 607 as a function of time 602 during a 4 stroke cycle engine in accordance with an aspect of the invention.

Beginning a cycle when the piston 604 is at TDC 601-1 heading towards cylinder volume expansion 601-2, exhaust valve 617 is closed, no spark 613 is given, the inlet valve 611 is open and inlet check valve 609 is open to ambient air. ECCA inlet valve 603 is opened, for duration based on CAS pressure and oxygen required in conjunction with fuel quantity to burn, at the end of intake stroke 601-1 and the beginning of compression stroke 601-2. Fuel injector 615 is metered on in proportion to the combined ambient and compressed air. The CAS check valve 607 is closed throughout this mode as compressed air from the CAS is flowing from the CAS into the cylinder. The compression stroke 601-2 has the piston 604 rising, exhaust valve 617 remaining closed, inlet valve 611 closed and ECCA inlet valve 603 remains open part way into the compression stroke 601-2. The end of the compression stroke 601-2 and beginning of power stroke 601-3 signals a spark 613 that initiates a power stroke which transfers power to the crankshaft. The following exhaust stroke 601-4 has an opened exhaust valve 617 which vents exhaust gas to the exhaust manifold.

Essentially, boost power mode provides programmed computer control actuation of cylinder unit component states in conformity with programmed boost power mode duty cycles responsive to engine power demand requirements, engine speed and cylinder unit piston position progress through compressed air intake, compression, power and exhaust strokes whereby a cylinder unit receives metered compressed air from a compressed air storage reservoir and proportionately larger fuel quantity is metered in accordance with a computer programmed fuel-mixture ratio function resulting in higher cylinder energy combustion for increased power.

Metering compressed air from CAS reservoir to cylinder units would require determining the ECCAIV upstream pressure, CAS, calculating ECCAIV open state duration time, and opening ECCAIV component at the required time and for the calculated duration. The timing requirements are based at least in part on the instant crankshaft position, starting from a known cylinder unit piston position relative to TDC, and in accordance with the assigned mode stroke sequence. The ECCAIV component open state duration would be determined based partly on the device flow characteristic parameters, device response profile, upstream CAS pressure and other factors. These factors are device specific and will generally have many engineering characteristic parameters to be taken into account in calculations of optimal metering duration time. A simple model would include the engine speed, mode stroke duty fraction and flow characteristics based on upstream compressed air pressure, CAS, roughly calculated as DT3 above in the Power Mode for the injector component, but with ECCAIV device parameters. The flow characteristics of a particular ECCAIV component are known to those skilled in the art.

In another embodiment, stoiciometric fuel quantity is metered in accordance with a computer programmed stoiciometric fuel-mixture data resulting in higher cylinder energy combustion and providing incrementally larger effective piston pressures in cylinder unit for boosted power stroke with optimal pollution emissions.

Compression Start Mode and Compression Idle Mode

Figure 7:
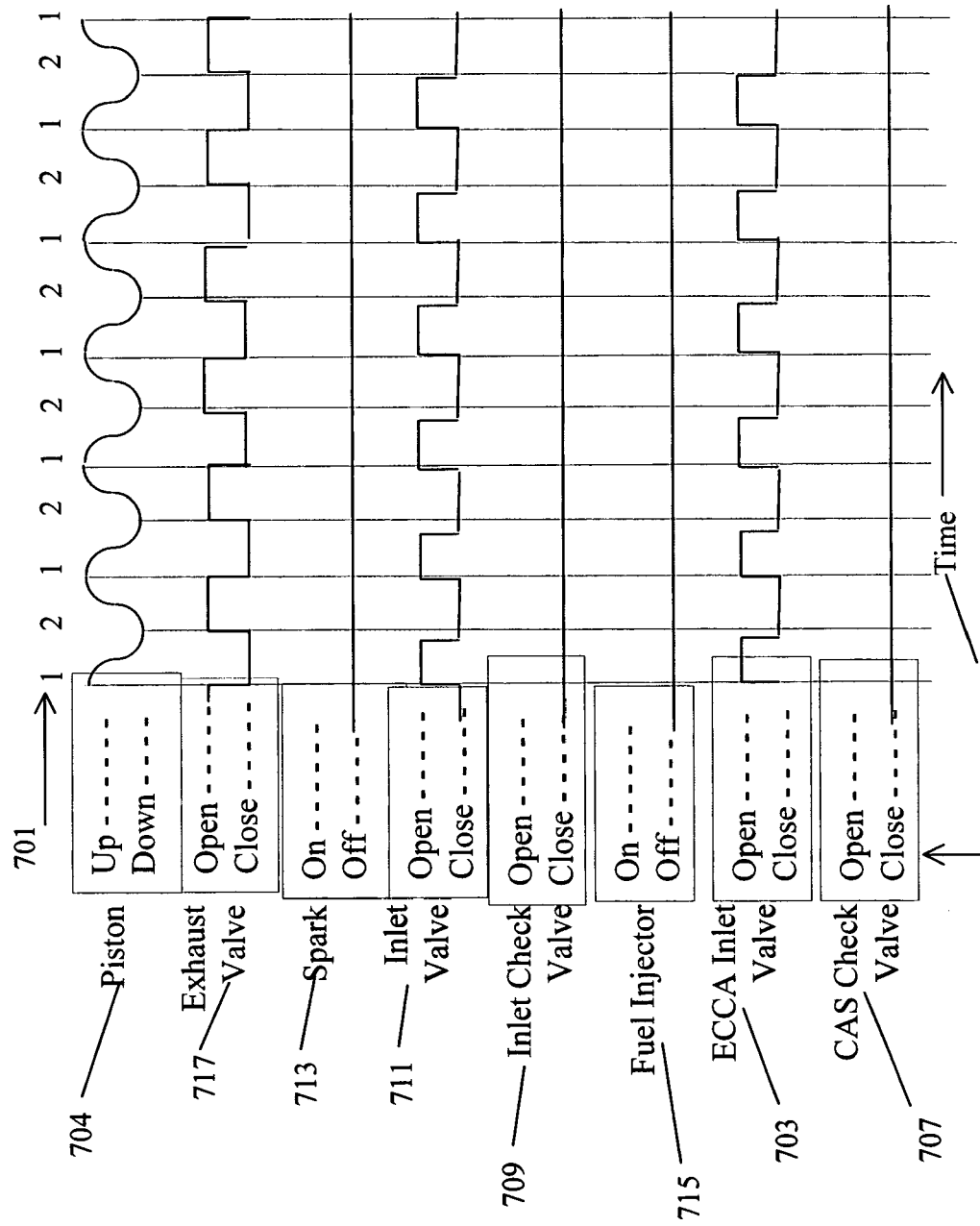
FIG. 7 is a timing diagram illustrating Compression Start Mode and Compression Idle Mode according to an embodiment of the present invention.

FIG. 7 is a timing diagram illustrating Compression Start Mode and Compression Idle Mode according to an embodiment of the present invention. FIG. 7 shows the component states 700 and duty cycles of a CPCPU piston 704, exhaust valve 717, spark 713, inlet valve 711, inlet check valve 709, fuel injector 715, ECCA inlet valve 703, CAS check valve 707 as a function of time 702 during engine start and engine idle in accordance with an aspect of the invention.

In engine start mode, the engine crankshaft is rotated from an initial static position. This requires that the pistons, crankshaft and flywheel need to overcome their static inertia to achieve dynamic rotation. The engine crankshaft positions are known from sensors, the individual positions of each piston in each cylinder-piston compressor-power unit (CPCPU) are also known. In compression start mode, the control logic will determine which CPCPUs are in the appropriate piston positions from crankshaft angle and will apply the duty cycle in FIG. 7 based on where piston pistons are in their logical duty cycle positions. As CPCPU pistons reach TDC, CPCPU components will be engaged to apply compressed air to the pistons forcing them to apply torque to the crankshaft. CPCPUs not engaged in application of air pressure to their respective pistons would be rendered in minimum resistance component states. CPCPUs with pistons in these unhelpful positions would have their exhaust valves 717 open and inlet valves 711 closed or vice versa so that no CAS energy is lost at those times and the piston does no compression work on compression stroke.

Beginning with a CPCPU in compression start cycle from piston 704 up 700 at minimum cylinder volume 701-1. No spark 713 is initiated through-out this mode. The inlet valve 711 and the ECCA inlet valve 703 are opened to provide compressed air to push on the piston 704 for crankshaft rotation. The exhaust valve 717 is closed 700 so that compressed air would work against the piston without venting. The inlet check valve 709 and CAS check valve 707 are both closed through-out the duration of this mode. There is no fuel injection 715 as the purpose is to rotate the crankshaft to sufficient RPM to switch the engine to power mode without the use of battery power to turn a starter motor. On the second stroke 701-2 from a BDC, the exhaust valve 717 would be opened to vent the cylinder-uncompressed air without working against the piston.

Compression Start Mode starts the engine by initiating engine crankshaft rotation with application of compressed air pressure on cylinder unit pistons disposed in positive power to crankshaft positions through admittance of compressed air into volume expanding cylinder units in accordance with start mode logic defining cylinder unit component states and computer processor program logic execution responsive to engine start signal, crankshaft RPM and crankshaft position.

In Compression Idle Mode, the requirement is that the engine crankshaft continues to rotate to preserve a steady engine operating inertia on "hot" standby so that when power from the engine is required, it will not have to overcome the large inertial forces of the engine to start, only the frictional forces to accelerate. Currently, idle is ordinarily accomplished by burning fuel at low engine RPM rates. An aspect of the current invention is to use stored compressed air for pushing pistons in idle mode to save from using fuel in power strokes during idle. Therefore, in idle mode, an engine controller maintains the speed of the crankshaft in accordance with the inertial demands that provide continued rotation by withholding fuel injection and spark but operatively introducing compressed air into the CPCPUs which have pistons positioned to cooperatively turn the crankshaft. Thus in any crankshaft position, some of the CPCPUs will be in those cooperative piston dispositions and some of the CPCPUs will be in air-compression dispositions. Since the crankshaft position is known and related to each CPCU disposition, exact individual CPCU disposition is known and the controller can operatively push compressed air into cylinders which will turn the crankshaft at a preset speed. A preset speed can be maintained by feedback from the rate of rotation sensor to control the amount of compressed air introduced into individual cooperating CPCPUs.

A simple exemplar snippet of programmable logic in the form of psudo code for processor control of engine components establishing an Compressed Air Idle Mode where direct compressed air is used to turn the crankshaft without fuel for an individual CPCPU n follows directly.

```
Compressed_Air_Idle_Mode( CPCPU_N )
{
    Schedule_at( PISTON_TOP_OF_STROKE_1st, CPCPU_N)
    {
        Dispatch_Exhaust_Valve_Close(CPCPU_N);
        Dispatch_Inlet_Valve_Open(CPCPU_N, DT2);
        Dispatch_Fuel_Injection_OFF(CPCPU_N);
        Dispatch_ECCAIV_Open(CPCPU_N);
    }
    Schedule_at( PISTON_BOTTOM_OF_STROKE_2nd,
    CPCPU_N)
    {
        Dispatch_Exhaust_Valve_Open(CPCPU_N);
        Dispatch_Inlet_Valve_Close(CPCPU_N, DT2);
        Dispatch_ECCAIV_Close(CPCPU_N);
    }
}
    DT2 = (Stoke/Rev)× (Fraction of IV stroke
    duty cycle)×(60)/(Engine_Speed)
```

IV=Inlet Valve

Stroke/Rev=stroke period per crankshaft revolution

Engine_Speed=instantaneous engine RPM

Fraction of IV duty cycle=optimized portion of stroke needed for state change to accomplish transfer of compressed air Compressed Air Idle Mode maintains engine crankshaft rotation by application of storage compressed air pressure on cylinder unit pistons disposed in positive power to crankshaft positions with said compressed air application responsive to crankshaft rotation timing at said pre-set engine speed through programmed computer control of cylinder unit component states in concert with the mode sequence strokes.

Re-Generative Compression Brake Mode

Figure 8:
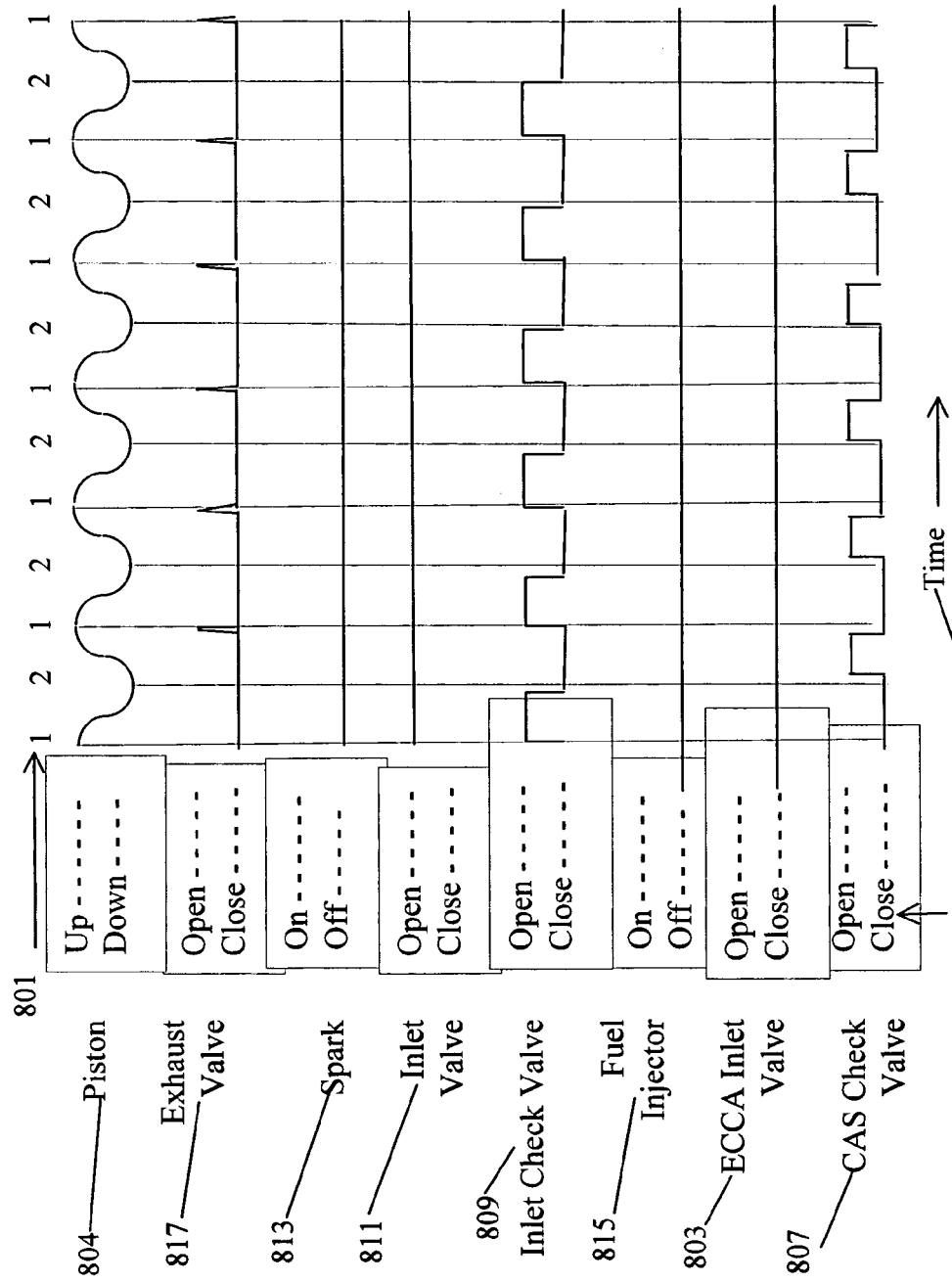
FIG. 8 is a timing diagram illustrating Re-generative Compression Braking Mode according to an embodiment of the present invention.

FIG. 8 is a timing diagram illustrating Re-Generative Compression Braking Mode, compression braking with Compressed Air Storage Tank Not full according to an embodiment of the present invention. FIG. 8 shows the component state positions 800 and duty cycles of a CPCPU piston 804, exhaust valve 817, spark 813, inlet valve 811, inlet check valve 809, fuel injector 815, ECCA inlet valve 803, CAS check valve 807 as a function of time 802 in a multi-stroke engine in accordance with an aspect of the invention.

As in compression braking w/CAS Tank Full, sensors signal an immediate need for the engine to reverse the direction of power transmission from power to the crankshaft to power from the crankshaft. Power is taken from the crankshaft when the pistons do work compressing air. The difference here is that the compressed air is stored in the CAS for later use. Since power and exhaust stroke are not needed in this mode, compression and intake strokes are all that are required. Therefore, exhaust valve 817 is closed for to majority of this embodiment duty cycle except as discussed below, no spark 813 is given for the entire mode and fuel injection 815 is also turned off for the entire mode. In an embodiment where the compressed air in the channel to compressed air storage impedes the inlet check valve 809 from opening, the exhaust valve 817 is cycled in very short pulses to vent any entrained compressed air that may cause residual backpressure at the intake check valve 809 resisting the intake check valve 809 state transition.

In this embodiment of Re-generative Compression Brake Mode the cylinder unit stroke-state switching means for either expelling contracting cylinder volume compressed air for alternate use is accomplished by setting CPCPU component states for compressed air expulsion 801-3 or for combusting compressed air-fuel mixture for power stroke CPCPU component states set as per 401-3 shown above in power operation and boost power 601-3 modes. In Re-generative Compression Brake Mode, the switching means is implemented with the cylinder unit components working in concert under computer processor control to expell compressed air to the CAS for alternate use.

For transferring the compressed air to CAS, the ECCA inlet valve 803 also stays closed during the entire mode as compressed air is being stored. The inlet valve 811 remains open for the entire cycle. Since the CAS tank is not full in this mode, the compressed air is flowed to the CAS via the CAS check valve 807. Beginning a cycle when the piston 804 is at TDC of its cycle position 801-1 heading towards cylinder volume expansion, the Inlet Valve 811 and Inlet Check Valve 809 are fully opened for ambient air that is drawn into the cylinder. Also in intake stroke, the ECVC Inlet Valve 803 and the CAS Check valve 807 are closed because ambient air pressure is less than CAS pressure. Directly following the compression stroke 801-2, CAS Check Valve 807 remains closed, Inlet valve 811 and inlet check valve 809 also remain closed. In some embodiments of the invention, regulated air flow communication between CPCPUs can conduct compressed air from a compression stroke of one CPCPU to the end of the intake stroke and the beginning of a the compression stroke of another CPCPU to further compress the compressed air, simultaneously providing even greater engine stopping power with pistons working against higher pressure air.

Although the alternate use in this embodiment of Re-generative Compression Brake Mode is for compressed air production transferred to the CAS, in another embodiment, distribution of the compressed air is made to other cylinder units through direct channels, bypassing the CAS or to external application direct use, also bypassing the CAS.

A simple exemplar snippet of programmable logic in the form of psudo code for processor control of engine components establishing a Compression Brake Mode with CAS Not Full where compressed air is stored for an individual CPCPU N follows directly.

```
Re-generative Compression_Brake_Mode ( CPCPU_N )
{
    Schedule_at( PISTON_TOP_OF_STROKE_1st, CPCPU_N)
    {
        Dispatch_Exhaust_Valve_Close(CPCPU_N);
        Dispatch_Inlet_Valve_Open(CPCPU_N, DT2);
        Dispatch_Fuel_Injection_OFF(CPCPU_N);
        Dispatch_ECCAIV_Close(CPCPU_N);
    }
    Schedule_at( PISTON_BOTTOM_OF_STROKE_2nd,
    CPCPU_N)
    {
        Dispatch_Inlet_Valve_Open(CPCPU_N, DT2);
        Dispatch_Exhaust_Valve_Period(CPCPU_N, T1);
    }
}
    DT2 = (Stoke/Rev)×
              (Fraction of IV duty cycle)×(60)/(Engine_Speed)
    T1 = (Stoke/Rev)×
          (1−(Fraction of IV duty cycle))×(60)/(Engine_Speed)
```

Computer operation and control of the Inlet_Check_Valve and CAS_Check_Valve are not necessary in a design which employs a flapper or check valve which change state as a function of local pressure conditions automatically as in this embodiment. Thus the ECCAIV is maintained closed and the CAS_Check_Valve allows cylinder compressed air to flow to the CAS.

Stroke/Rev=stroke period per crankshaft revolution

Engine_Speed=instantaneous engine RPM 310, FIG. 3

Fraction of IV duty cycle=optimized portion of stroke duration, needed for state change to accomplish transfer of compressed air Essentially, re-generative brake compression mode operation provides programmed computer control actuation of cylinder unit component states in conformity with programmed re-generation brake compression mode duty cycles responsive to brake demand requirements, engine speed and cylinder unit piston position, extracting work from the crankshaft by receiving, compressing and storing air in compressed air reservoir for subsequent engine or alternate compressed air use.

Vacuum Mode

Instead of intake stroke drawing in air for compression and power, an embodiment of the invention re-configures the engine into a vacuum pump, which draws a vacuum that can supply less then ambient air pressure on demand, for suction or siphon applications.

Vacuum can be an energy storage mechanism where a pressure differential can do useful work. Applications requiring vacuum for such things as an external suction pump, for a pressure differential to draw flow or for creation of vacuum for engine braking all provide alternate uses for a vacuum.

Figure 9:
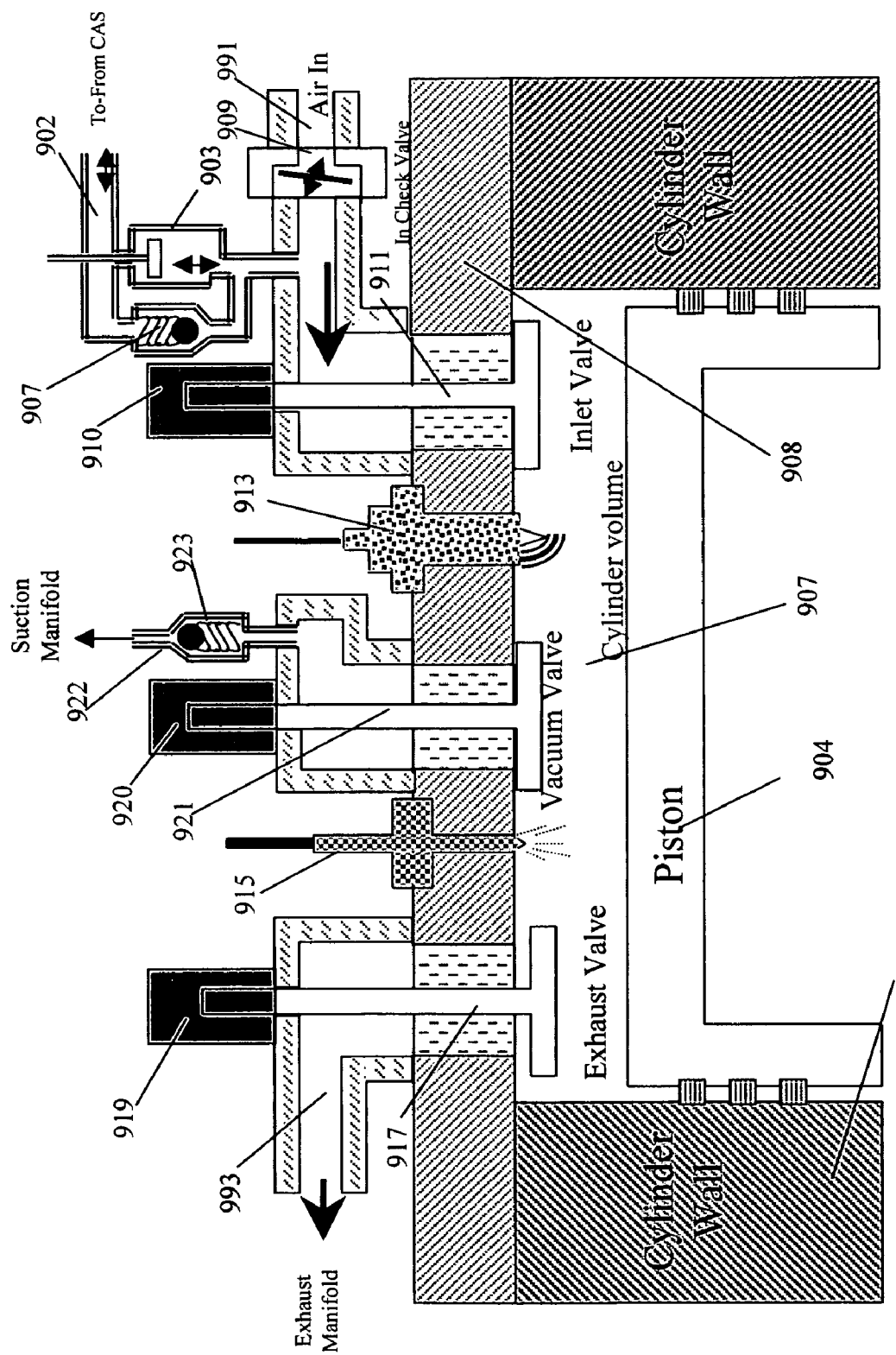
FIG. 9 is an engine block cutout view illustrating a DRIC engine cylinder unit according to a vacuum generation embodiment of the present invention.

FIG. 9 is a partial engine block cutout view illustrating an aspect of a dynamically re-configurable internal combustion engine cylinder unit in accordance with another embodiment of the present invention. The cylinder 906 with cylinder head 908 and expandable cylinder volume 907, piston 904, camless electronically controlled exhaust valve 917 and actuator 919, camless electronically controlled inlet valve 911 and actuator 910, inlet check valve 909, electronically controlled fuel injector 915, camless electronically controlled vacuum valve 921 and actuator 920, vacuum check valve 923 directing vacuum to suction manifold 922, electronically controlled fuel mixture igniter 913, compressed air inflow electronically controlled valve 903, compressed air cylinder compressed air outflow check valve 907, connectivity to fluid cavities and passages to air intake 991 exhaust manifold 993 or compressed air reservoir 902, comprise a Cylinder-Piston Compression-Power Unit (CPCPU) for this embodiment. The third cylinder valve, vacuum valve 921, is used to facilitate another CPCPU function, creation of a vacuum for alternate uses. As in the above embodiments, although these CPCPUs operate in concert, they are independently controlled under a computer control system.

In vacuum mode, the control system outputs commands to electronically controlled CPCPU components for the vacuum mode generally as follows. The state of the vacuum valve 921 at a cylinder-piston expandable volume 907 appropriate to the vacuum requirements is executed via electronic control of vacuum valve actuator 920. Inlet valve 911 remains closed throughout this programmed duty cycle. With inlet valve 911 and exhaust valve 917 closed, the piston 904 travels to expand the volume creating a vacuum, which upon opening of the vacuum valve 921 will communicate the vacuum through the vacuum check valve 923 to suction manifold 922. Thus, power is taken from the crankshaft as it performs work on expanding the CPCPU volume to create a vacuum. Moreover, the vacuum mode can be useful in engine braking as well, if compressed air storage is full and additional engine brake power is required, wherein vehicle inertia turns the crankshaft providing vacuum work to slow a vehicle.

Figure 10:
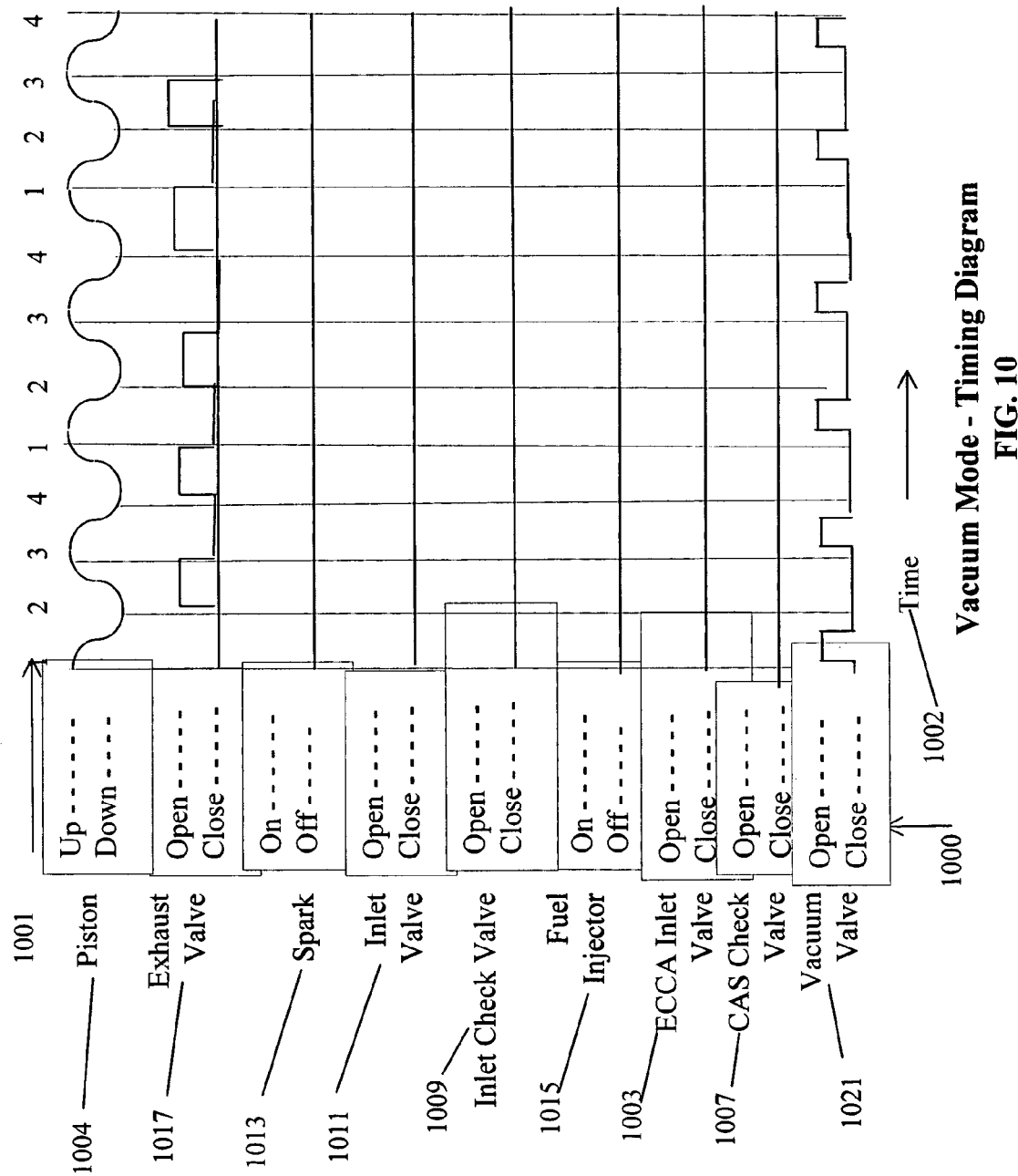
FIG. 10 is a timing diagram illustrating a Vacuum Mode according to an embodiment of the present invention.

FIG. 10 is a timing diagram illustrating a Vacuum Mode for the embodiment of the present invention described immediately above in FIG. 9. FIG. 10 shows the component state positions 1000 and stoke cycles 1001 of a CPCPU beginning with piston 1004, exhaust valve 1017, spark 1013, inlet valve 1011, Inlet Check Valve 1009, fuel injector 1015, ECCA Inlet Valve 103, CAS Check Valve 1007 and vacuum valve 1021 as a function of time 1002 during a two-stroke cycle in accordance with an aspect of the invention.

Non changing CPCPU component states for the vacuum mode are Spark 1013 off and fuel injector 1015 off. Inlet valve 1011, inlet check valve 1009, ECCAIV 1003 and CASCV 1007 respective component states are closed throughout this mode. During the first stroke 1001-1, the piston starts from TDC, valves 1017 1011 1021 to the cylinder are closed and the piston 1004 is pulled by the crankshaft to expand the cylinder-piston work volume to create a vacuum. The second stroke 1001-2 beginning at BDC and proceeding to reduce the cylinder volume of the vacuum created does so with the vacuum valve 1021 state open by actuator 922. The vacuum is communicated to the vacuum manifold and at TDC the cycle is complete. CPCPUs operating in vacuum mode under programmed computer control actuation of cylinder unit component states in conformity with programmed Vacuum Mode duty cycles are responsive to engine suction head requirements, engine RPM and cylinder unit piston position.

Yet another embodiment of the invention with a vacuum mode is configurable with two cylinder electronic valve components, inlet and exhaust valve with their associated actuators, and additional valves upstream of the inlet check valve essentially taking on the function of communicating vacuum between the cylinder and vacuum manifold analogous to cylinder compressed air with the CAS, separately and at operable times.

Three-Valve Embodiment

An aspect of the invention provides each cylinder unit with a stroke state switching means for either expelling contracting cylinder volume compressed air for alternate use or for combusting retained compressed air-fuel mixture for a power stroke. An embodiment of the invention depicted in FIG. 11 employs three electronically controllable cylinder valves, and associated cylinder unit components under electronic control to provide the means to perform this switching. This third electronically controllable cylinder valve, facilitation valve, in concert with the inlet and exhaust valves regulates compressed air to and from the cylinder volume. The facilitator valve takes over the function of the CAS Check Valve and ECCA Inlet Valve of the FIG. 1 embodiment, providing the means for electronic control of cylinder unit component state settings to build sequences of strokes to create alternate engine modes of operation.

Figure 11:
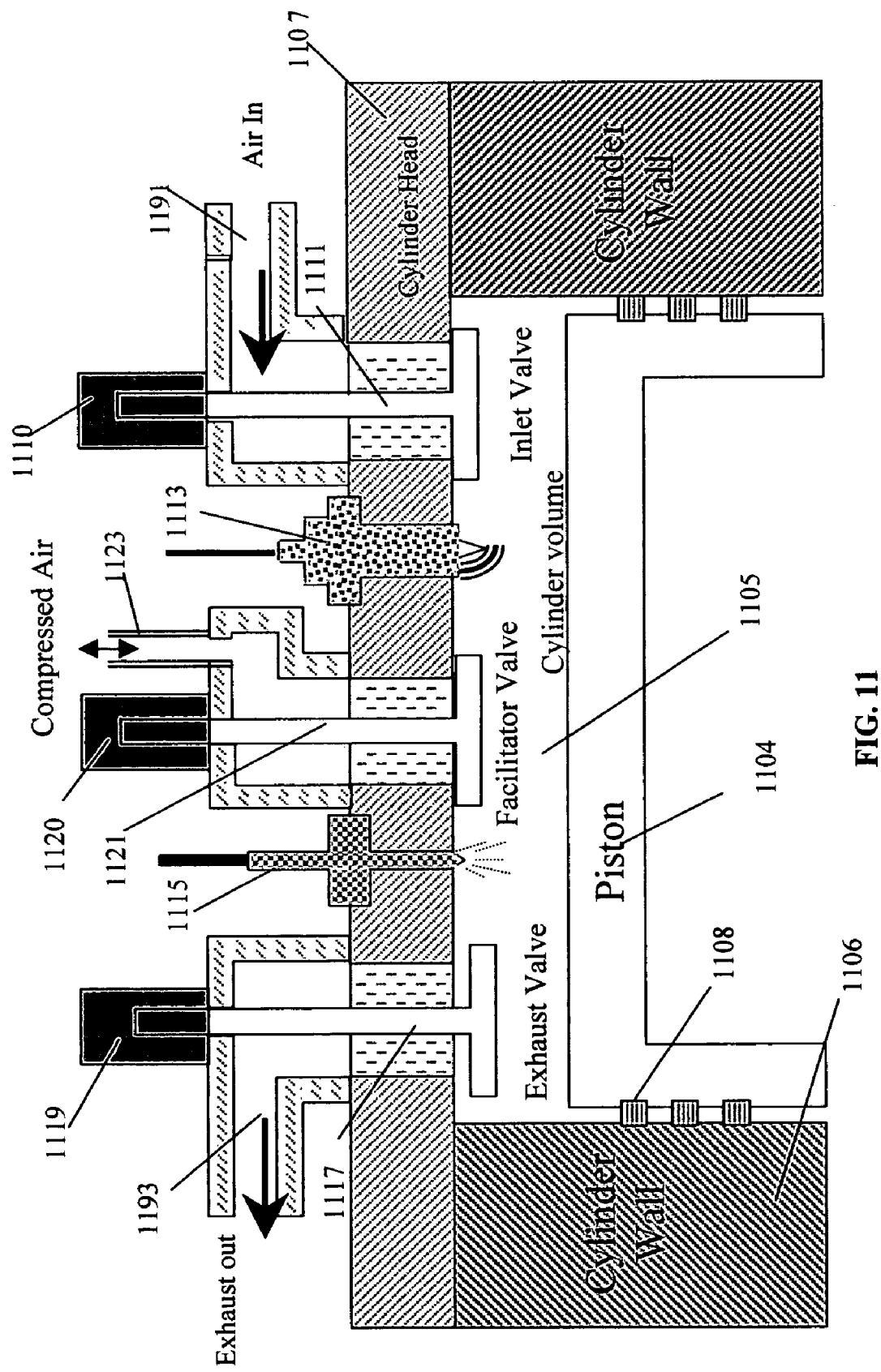
FIG. 11 is an engine block cutout view illustrating a DRIC engine cylinder unit in accordance with a three valve embodiment of the present invention.

FIG. 11 is an engine cutout view illustrating an embodiment of a dynamically re-configurable engine cylinder unit in accordance with a three valve embodiment of the present invention. The components shown in FIG. 11 are: processor controlled electronic ignition 1113, electronically controlled fuel injector 1115 which is shown inside the cylinder unit for inclusion and not design since most gas engines use a port injector and diesel engines use direct in the cylinder or pre-chamber injectors. Other CPCPU components include camless electronically controlled air inlet valve 1111 and associated actuator 1110, ambient air inlet 1191, cylinder 1106 with changeable cylinder volume 1105, cylinder head 1107, camless electronically controlled exhaust valve 117 and attached actuator 1119 acting to regulate expulsion of exhaust between cylinder 1106 and exhaust outlet 1193, piston 1104 and piston rings 1108. These all in addition to a camless electronically controlled facilitator valve 1121 and attached actuator 1120 controlling compressed air flow to and from compressed air source 1123 comprise a Cylinder-Piston Compression-Power Unit (CPCPU) embodiment and are as in previous embodiments independently operated under a computer control system.

While the FIG. 1 two-valve cylinder embodiment employs an associated CAS check valve for outgoing compressed air and an electronically controllable compressed air inlet valve (ECCAIV) for metering incoming cylinder air, the FIG. 11 embodiment creates a substantially similar functionality with the electronically controlled facilitator valve component having multiple states under computer processor control. The facilitator valve open state timing and duration allows metering of compressed air to and from compressed air source and cylinder, which facilitates the engine alternate uses. The time and period that the facilitator valve 1121 remains open is depends which way the compressed air will flow. It can be a function of the pressure of the compressed air source, and is determined by computer logic and allows metering at programmed time the amount of compressed air introduced to the cylinder volume from compressed air source through compressed air channel 1123.

The cylinder component states are under computer control and programmed with a defined mode of operation to provide the means to switch from one stroke to a subsequent programmed stroke. As with the facilitator valve 1121, control program logic accepts external signals such as crankshaft positions, engine RPM and real-time demand inputs in determining time and duration of each component state and for state transitions.

Figure 12:
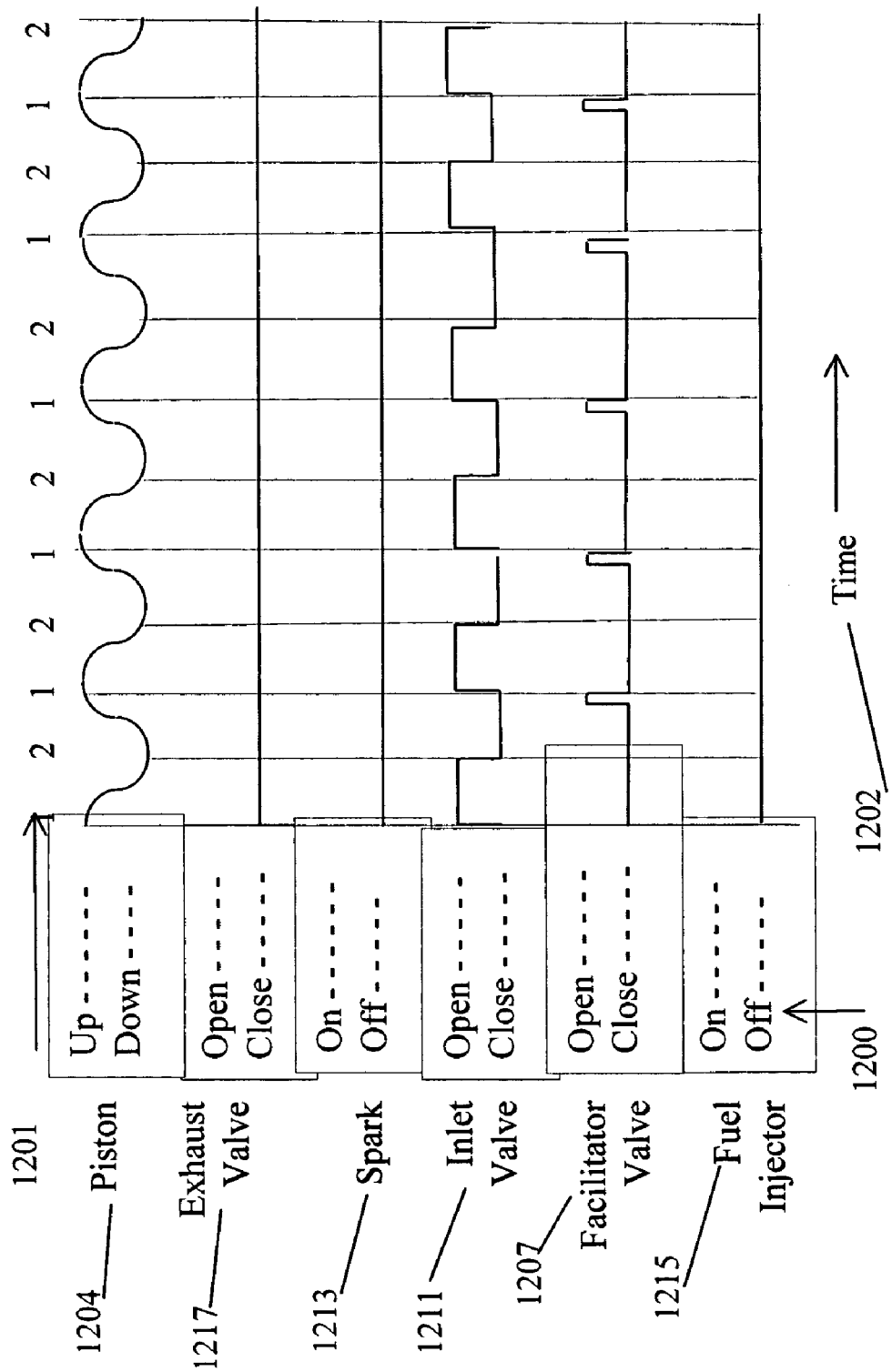
FIG. 12 is a timing diagram illustrating Compressed Air Production Mode according to a three-valve embodiment of the present invention.

FIG. 12 is a simple timing diagram illustrating Compressed Air Production Mode according to a three valve in cylinder unit embodiment of the present invention. FIG. 12 lists the component state positions 1200 and stroke positions 1201, piston 1204, exhaust valve 1217, spark 1213, inlet valve 1211, fuel injector 1215, and facilitator valve 1207 of a CPCPU as a function of time 1202 during a two-stroke cycle in accordance with an aspect of the invention.

The computer control system outputs commands to the electronically controlled components in Compressed Air Production Mode component states generally as follows: spark 1213 and fuel injector 1215 states are off and the exhaust valve 1217 is closed. During the first stroke 1201-1, the piston 1204 starting from TDC, inlet valve 1211 is open and the piston 1204 is pulled by the crankshaft to expand the cylinder volume to draw in ambient air. The second stroke 1201-2 starts at BDC, the inlet valve 1211 is closed and the piston 1204 proceeds to contract the cylinder volume and hence compress the air. During this compression stroke, the faciliator valve is opened and closed towards the end of the stroke to expel the compressed air into the compressed air channel 1123 for alternate compressed air uses.

As in previous embodiments, in this embodiment the CPCPU component states are set through sensor inputs and programmed logic based on required engine modes and mode duty cycles to meet vehicle signal requirements such as compressed air demand or compressed air braking. Sensor inputs such as crankshaft position inform the control system when each cylinder unit is at piston TDC, a natural time to begin many stroke sequences. However, the stroke start time not constrained to TDC and can begin before or after TDC. The changes in engine RPM sensor signals the control system whether mode changes in some cylinder units were sufficient to meet demand changes for power or braking. For example, vehicle incline or engine detonation signals inform the engine control logic when conditions trigger demand for compressed air production or smart mode initiation respectively. The computer control system includes timing or duty cycle logic which programmably defines what cylinder component states must exist and when in time they must be set to establish the required stroke sequence for compressed air production.

Although the alternate use in this embodiment for compressed air production can be triggered from vehicle braking signal, compressed air can be produced for alternate external uses even with the vehicle at stop, from Air Compression Standalone Mode signal. The crankshaft provides the power to compress the air and that power can come from other CPCPUs in power mode or boost power mode. In an embodiment without the CAS, distribution of the compressed air is made directly to external applications.

Figure 13:
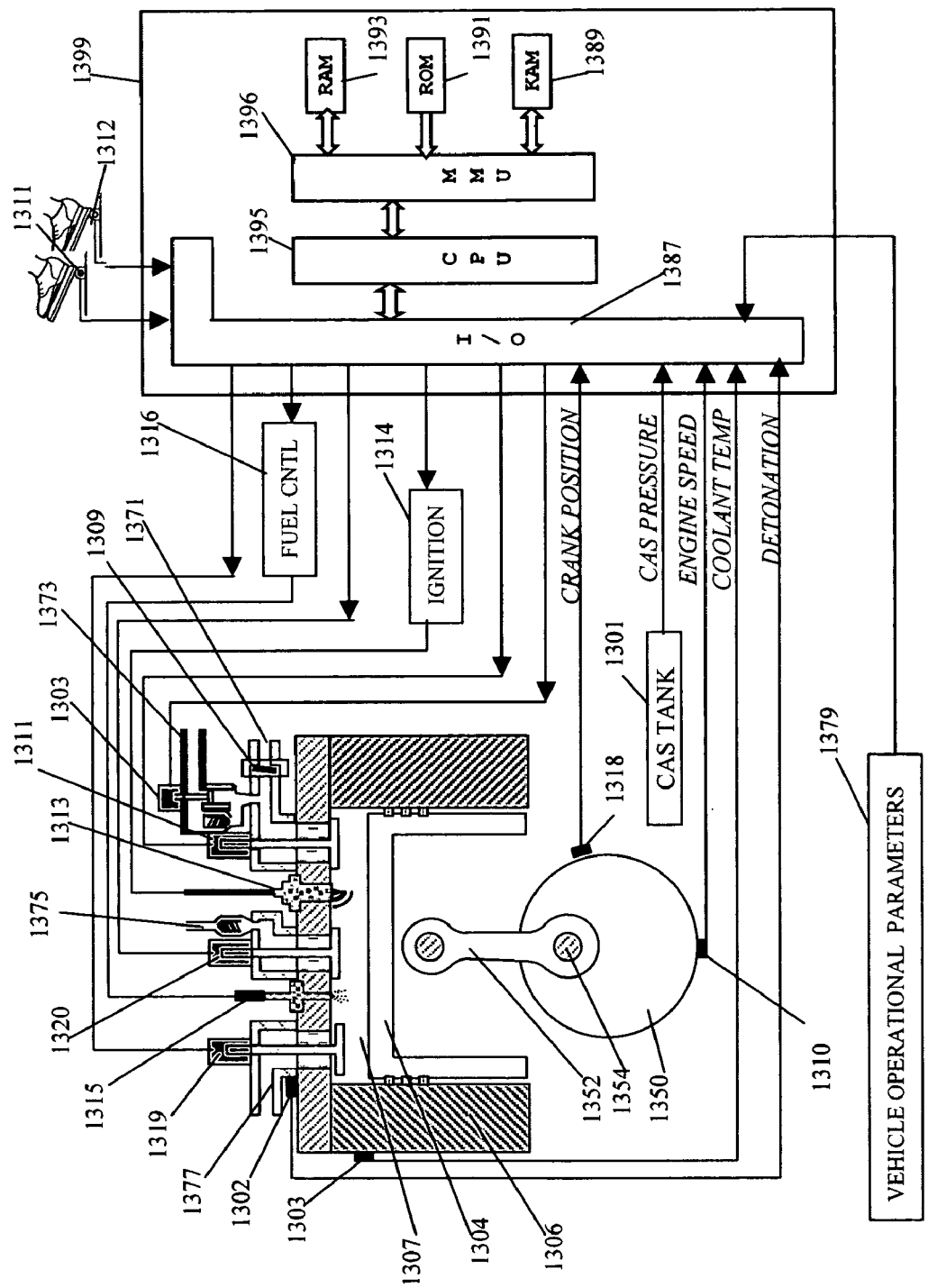
FIG. 13 is a schematic of a vehicle having a DRIC engine and an engine control system for controlling the DRIC engine according to an embodiment of the present invention.

FIG. 13 is a schematic of a vehicle having a DRIC engine and an engine control system for controlling the DRIC engine in accordance with the present invention. As will be appreciated by those of ordinary skill in the art, the present invention is independent of the particular underlying engine configuration and as such can be used with a variety of different internal combustion engines having different engine configurations and other vehicle parameters. The engine for example can be constructed and arranged with one or multiple cylinders as a diesel or gasoline engine used for generating power, or as a DRIC engine operating to store or re-generate vehicle inertia. Similarly, the present invention is not limited to any particular type of apparatus or method required for changing the operating stroke sequences of internal combustion engines or altering the cylinder firing order of internal combustion engines. Referring again to FIG. 13, the engine includes a plurality of cylinders (only one shown), each cylinder 1306 having a combustion chamber 1307, a reciprocating piston 1304, electronic compressed air valve actuator 1303, electronic intake valve actuator 1311, electronic facilitator valve actuator 1320 and electronic exhaust valve actuator 1319, compressed air plenum 1373, ambient air inlet 1371, vacuum plenum 1375 and cylinder discharge 1377 respectively. The piston 1304 is coupled to a connecting rod 1352 which itself is coupled to a crankpin 1354 of a crankshaft 1350. Fuel is injected to the combustion chamber 1307 via a fuel injector 1315 and is delivered in quantities metered by an electronic driver circuit 1316 under commands from the engine controller 1399 (or equivalent). Ambient air 1371 is nominally drawn via a controlled intake check valve 1309 disposed within the intake manifold. Ignition spark is provided to ignite fuel-air mixture via spark plug 1313 and ignition system 1314 in accordance with a spark advance (or retard) signal from the electronic controller 1399 in response to but not limited to engine detonation signal 1302. Fuel mixture ignition can also be obtained by spontaneous combustion of injected fuel where the vehicle engine is of the diesel type and combustion time is predictable from fuel injection time.

As shown in FIG. 13, the engine controller 1399 nominally includes a microprocessor or central processing unit (CPU) 1395 in communication with computer readable storage devices 1393 1391 and 1389 via memory management unit (MMU) 1396. The MMU 1396 communicates data (including executable code instructions) to and from the CPU 1395 and among the computer readable storage devices, which for example may include read-only memory (ROM) 1391, random-access memory (RAM) 1393, keep-alive memory (KAM) 1389 and other memory devices required for volatile or non-volatile data storage. The computer readable storage devices may be implemented using any known memory devices such as programmable read-only memory (PROM's), electrically programmable read-only memory (EPROM's), electrically erasable PROM (EEPROM's), flash memory, or any other electrical, magnetic, optical, wireless or combination memory devices capable of storing data, including executable code, used by the CPU 1395 for controlling the DRIC engine and to some extent the vehicle hosting the DRIC engine. Input/output (I/O) interface 1387 is provided for communicating with various sensors, actuators and control circuits, including but not limited to the devices shown in FIG. 13. Input devices include an engine speed sensor 1310, crankshaft position 1318, cylinder detonation sensor 1302, engine coolant temperature 1303, power pedal position sensor 1311, brake pedal position sensor 1312, and CAS pressure.

Output command and control includes electronic fuel control driver 1316, ignition system 1314, electronic compressed air valve actuator 1303, electronic intake valve actuator 1311, electronic facilitator valve actuator 1320 and electronic exhaust valve actuator 1319. These outputs are shown for one cylinder unit but would apply for each cylinder unit in the engine and are used to control the states for the cylinder components in concert with associated piston to generate stoke sequences from programmed modes of operation.

The sensors shown provide information about events, conditions and vehicle operating parameters 1379 that affect the scheduling of engine mode invocation from a plurality of engine modes. The term "vehicle operating parameters" herein refers broadly to any vehicle operating parameters, including engine-operating parameters, which are sensed, computed, derived, inferred or otherwise provided. Other vehicle sensors not listed in the present embodiment are not precluded from application by this invention. Modes of operation are comprised of engine component state configurations that define strokes and in concert, stroke sequences. The controller 1399 receives signals from vehicle operating parameters, processes stored logic which uses the parameters to schedule engine modes of operation in time and across engine cylinder units in real-time.

Figure 14:
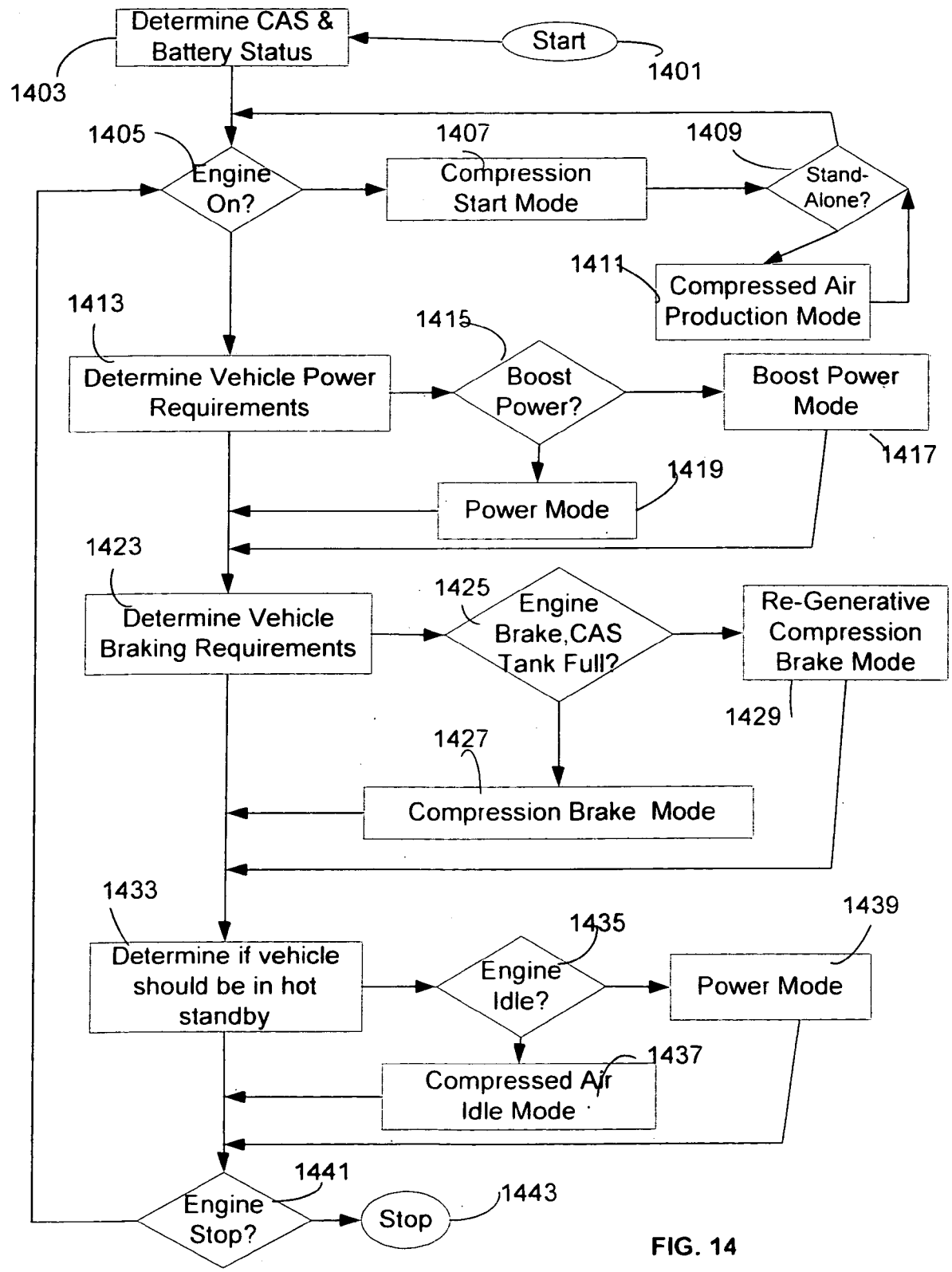
FIG. 14 is a high level flow chart of a method for controlling a DRIC engine coupled to the operation to a vehicle in accordance with an embodiment of the present invention.

FIG. 14 is a high level flow chart of a method for controlling a DRIC engine coupled to the operation to a vehicle in accordance with the present invention, a simple real-time continuous engine control program logic. Execution begins at Start 1401 wherein upon receiving a vehicle parameter Ignition System signal the controller logic proceeds in this embodiment to Determine CAS & Battery Status 1403. Determining status includes sensing and reading CAS_Tank_Pressure sensor data to ascertain if there is sufficient pressure in the CAS for a Compression Start Mode 1407 start. If insufficient pressure, the controller signals the battery start the engine. If the Engine On logical 1405 is false, control execution branches to Compression Start Mode 1407 where upon the engine is started on compressed air from CAS in accordance with the Compressed Air Start Mode. The program logic will then query whether a vehicle parameter such as Compressed Air Standalone Mode signal was received which in the affirmative will branch to a Compressed Air Production Mode 1411, placing the engine in a mode which will supply compressed air to CAS reservoir for external applications requiring compressed air without the vehicle otherwise operating. A CAS tank low-pressure signal will initiate Compressed Air Production Mode 1411 to recharge the CAS. Standalone Compressed Air Production Mode would require engine power mode in some cylinder units sufficient to compress air in other cylinder units as defined by those modes.

If the Engine On 1405 is true, as sensed from positive vehicle parameter Ignition signal and Engine Speed sensor, the flow of execution proceeds to Determine Vehicle Power Requirements 1413. In a simple fundamental model, power requirements are determined from the receipt of Pedal Position signal. In more complex embodiments, parameters such as Engine Speed, Crankshaft Position, available compressed air CAS tank pressure or engine and other vehicle parameters can also serve to establish how many engine cylinder units will need to initiate Power Mode 1419 unless greater power from a Boost Power Mode 1417 is required. Greater and higher rates of pedal power position, larger vehicle include angles, low engine speed and other factors will generally dictate more cylinder units in power or boost power mode in accordance with programmed logic.

The program logic will proceed to determine vehicle-braking requirements 1423. Determine Vehicle Braking Requirements 1423 can diverge along two general paths, to use engine compression braking and friction braking in series or in parallel. While engine compression braking first and friction braking second in sequence would be a more energy re-generative approach and less wearing on the friction brake components, this is not the simplest approach because vehicle friction brakes have become more sophisticated, some using computer controls with sensors which add complexity to a sequential application. Therefore a fundamental mode of operation for the present invention would be to apply engine compression braking in parallel with friction braking. The trigger for braking can come from a variety of signals and devices. Such signals from sensors or devices providing information available for determining vehicle-braking requirements can be from but are not limited to; brake pedal position change per time, brake line fluid pressure change per time, deceleration rate from accelerometer, wheel rotation sensor signal, brake temperature change per time, vehicle inclination sensor signal, brake temperature sensor, and historical brake data stored in KAM, RAM, ROM, etc. Reception of a brake signal will execute the inquiry as to CAS Tank pressure 1425. If the CAS is not full the program will configure the engine to Re-Generative Compression Brake Mode 1429, otherwise to Compression Brake Mode 1427 subsequently branching back to the main loop.

The program logic will continue to determine if the vehicle should be in hot standby 1433. In a simple fundamental model, this is established by absence of Pedal Position signal. More complex logic can factor in such vehicle parameters as Engine Coolant Temperature, Vehicle Speed, Engine Speed, etc. If hot standby is called for and there is available CAS_Tank_Pressure, then the Engine Idle 1435 query is affirmed and the program will execute an Compressed Air Idle Mode 1437. This will allow the engine to run by compressed air, conserving fuel and cooling the engine. If sufficient compressed air is unavailable, CAS_Tank_Pressure is less than the requisite level, a low RPM Power Mode 1439 will be invoked. Execution will then branch back to query if an engine stop 1441 signal has been received. Reception of an engine kill signal will branch the program logic to stop 1443 the engine, absent that to continue systematically executing for further triggering changes at 1405.

Mixed Mode Operation, CPCPU Mode Transitions and Load Balancing

Since power is developed during only one stroke in the power mode, a single CPCPU multi-stroke engine has a low degree of uniformity and the rotation of the crankshaft is subject to considerable accelerations and decelerations during a complete mode cycle. For this reason multiple cylinder engines are useful because they produce smoother running engines.

In an aspect of the invention, the CPCPU firing order is designed to reduce vibration and engine rocking thus improving engine wear, balance and smoothness of operation. However, the firing order is changeable in accordance to the CPCPU modes of operation in fulfilling requisite programmed scenario requirements. Therefore in an embodiment of the present invention, power strokes would be scheduled to be evenly staggered along the crankshaft among the individual CPCPUs, so that power strokes are developed not necessarily successively but uniformly in consideration of mode of operation, engine vibration and other vehicle paramters. Therefore, in an embodiment of the invention operating in more than one mode, Power Mode in some CPCPUs and Compression Mode in other CPCPUs, Compression Mode CPCPUs are selectively interspersed between the Power Mode CPCPUs whereby power strokes are optimally located along a succession path with other strokes and modes of engine operation which are more likely to damp crankshaft vibration and or the shift crankshaft vibration frequency content to less engine wearing frequencies. The balancing mode sequence and CPCPU firing order are engine parameter specific and are mentioned here as additional optimizing benefits from operations in mixed-mode.

Within the mechanical continuity of the basic crankshaft-piston rod-piston-cylinder position constraints, the present invention embodiment computer control system can transition individual CPCPUs between operating modes in virtually real-time. Since the DRIC is under processor control, electronic sensor, processor response time and electronically controlled CPCPU components under computer control are orders of magnitude (nanoseconds) shorter than can be accomplished with mechanical control components (milliseconds) where even practicable. The electronic switching latency times controlling mechanical component states shorten the difference but electronic switching retains sufficient margin over mechanical switching to allow flexibility and speed required for the dynamic re-configuration to occur. Switching modes for a particular CPCPU would occur instantaneously relative to the engine RPM. Although switching modes for a particular CPCPU can likely be implemented most efficiently when the piston position is nearing the TDC of a stroke, a CPCPU mode change can be initiated at any part of the engine crankshaft angle or position. Initiation of mode is also dependant upon computer system latencies and mechanical component response delays. These know characteristics and engine parameters can be anticipated and programmably factored into control logic to correct and predict component state timing for optimal results. A CPCPU could continue to run or cease to function in the previous mode in anticipation of a new program commanded mode of operation in accordance to programmable logic based on these aforementioned factors. A simple CPCPU transition sequence may include stopping fuel injection, stopping spark, opening the exhaust valve and waiting for the piston to reach top of a stroke before initiating a new mode sequence. Alternatively, a from mode can be completed within a crankshaft cycle and the to mode can be programmed to begin at CPCPU TDC or some appropriate crankshaft angle where the CPCPU piston is proximate to the top of its stroke, but optimally at the best time to begin the mode before or after TDC.

Treating engine CPCPUs as power, vacuum or air compressor units, engine CPCPUs can operate at different modes simultaneously and in concert with other CPCPUs. Vehicle operating conditions where engine timing is known, power requirements or air compression requirements are received, sensor information is factored in, the processor is programmed to determine how many and what modes each CPCPU would operate in optimally, in real-time based on programmed mode duty cycles, input mode determination logic and engine parameters. In an embodiment where the compressed air storage reservoir is full and power requirements are low, the control system will program some CPCPUs to power mode and other CPCPUs idle, thus saving fuel. However, real-time conditions and therefore vehicle circumstances would be changed the instant another mode is required in accordance to sensor data from vehicle operation parameters and programmed logic responding to those inputs. For example, if the engine is substantially in a power mode configuration and a large braking rate demand signal is raised, the engine controller will determine the compression braking power required, generally in a fundamental mode of operation this requirement would be in proportion to the brake pedal position rate of depression. Then a mode with selected CPCPUs incorporating compression braking would be executed to engage some or all CPCPUs for more vehicle stopping power. In more complex embodiments, braking requirements response logic can include CPCPU mode transitions programmed to engage CPCPUs with delays to make vehicle ride characteristics as even as possible.

A simple way to synchronize timing among the engine CPCPUs would be done by using a known crankshaft position from the crankshaft position sensor, using the relationship of individual CPCPU piston positions to the crankshaft rotation angle. Crankshaft position sensors are currently used to determine such things as firing order, degrees before top dead center, when cylinders are at TDC, spark timing, fuel injection timing and other various computer input requirements. Crankshaft position sensors are readily available as are electronic methods of maintaining exact crankshaft angle for CPCPU timing, transition and mode cycle basis which are known by one skilled in the art.

In an embodiment of the invention, engine CPCPUs can work at different modes in an optimal programmable fashion based on input sensor data, programmed mode operating scenarios and programmed duty cycles for particular modes. Moreover, in transition of a CPCPU from one mode to another, a previous mode piston stroke can be completed as signaled by the crankshaft angle before the new mode engages. For example, in a four CPCPU engine it may be optimal to operate CPCPUs 1 and 3 in power mode and Cylinders 2 and 4 in Air Compressor mode rather than to operate Cylinders 1 and 2 in power mode and Cylinders 3 and 4 in Air Compression. However, this may be altered if one mode contains larger crankshaft vibration than another mode. Many factors such as engine thermal characteristics, material stress distribution, engine vibration, uniform component wear, engine power requirements, mode switching requirements and other engine parameters can be considered in operating the different CPCPUs in an optimal mixed mode configuration.

In mixed mode operation, one or more selected engine cylinder units are computer program controlled and operated in a mode different from, but in concert with one or more alternate engine cylinder units while maintaining crankshaft timing adherence to cylinder piston position stroke continuity by electronically setting cylinder unit component states in accordance with programmed computer logic responsive to sensor input signals and programmed duty cycle modes and crankshaft angle for selected concurrent operation.

Although Re-generative Compression Brake Mode will produce compressed air from vehicle braking with distribution to the CAS for alternate use, compressed air can be produced for alternate external uses from a stationary vehicle. The DRIC engine crankshaft provides the power to compress the air and that power can also be generated from CPCPUs in mixed modes with power mode or boost power mode. In an embodiment of the invention, upon Air-Compression_Standalone_Mode to the engine control system, the DRIC engine will operate in mixed mode to provide power from some CPCPUs to compress air in other CPCPUs for alternate external uses as required using the CAS. In an embodiment without the CAS, distribution of the compressed air is made directly to an external application.

Moreover, a thee valve cylinder embodiment is expandable to incorporate more cylinder valves such as a vacuum valve from the vacuum embodiment directly above to facilitate the vacuum switch means in the same cylinder unit. These functions can also be implemented with cylinder external valves, which under computer control of cylinder associated components would direct compressed air or vacuum along paths necessary for the completion of their associated modes.

Smart Internal Combustion Engines

Aspects of the invention provides for "smarter" engines as they are not limited by fixed stroke cycle design and hence allow for programmable mechanical options dynamically implementable. Thus embodiments of DRIC invention engine control system provide methods by which an internal combustion engine can more intelligently function in more capacities than were possible through an unchangable stroke sequence. Scenarios for smart engine response are programmable and are coupled with alternate engine operation modes, executed by a computer control of individual CPCPU component states and stroke sequences which also allows for operation circumventing certain component failures.

In addition to the modes and scenarios illustrated above, several scenarios involving automatic loss of performance mitigation, critical component mode failure and loss of coolant event are addressed below.

Automatic Performance Mitigation and Control

In the event a particular cylinder ceases to function for reasons such as malfunctioning fuel injection, faulty wiring, electrical component failure, fouled spark plug, etc, a current engine's power output suffers to the point that individual component malfunction results in sluggish engine performance or worse, triggers a common mode failure which precludes any meaningful use of the engine until the malfunctioning component is repaired. The DRIC engine provides power, exhaust, compression and vacuum functionality on demand in virtually real-time engine reconfiguration. Since the DRIC engine provides the capability of independent cylinder operating modes, the malfunctioning cylinder can be reconfigured to reroute functionality to cylinder(s) that are not affected by the malfunctioning component and thereby mitigating the malfunctioning components by allowing the affected cylinder unit to continue to function in other modes which are not affected by the malfunctioning component(s).

For example, malfunctioning fuel injector or spark plug in CPCPU 3 would send a CPCPU lack of fuel detonation signal that would trigger engine control system to mark CPCPU 3 for air compression or vacuum modes only. The compressed air generated from the "bad" CPCPU can still be used to maintain or increase overall engine performance. Thus, while an error message can be relayed to the operator as to the malfunction(s), the DRIC engine by virtue of its adaptable control system can bypass the damage by re-configuring the engine modes. Cylinder power depends on several factors, a major factor being the mean effective pressure produced by the air-fuel mixture bum. Since engine dimensional parameters and variables can be stored in the engine control system memory and the processor programmed to calculate the necessary effective pressure and additional fuel necessary to increase power from the "lost" unit, a processor can be programmed to calculate a new theoretical power output for a CPCPU based on signals received from the engine indicating that such a scenario currently exists. In this scenario, postulating the engine an 8 cylinder engine and currently only capable of power from 7 cylinders and clogged cylinder injector, a gross engine power loss of 13% would be expected. The engine sensor signals and programmed logic would execute to trigger the DRIC control system to mark CPCPU 3 for compressed air mode only, compressed air which would then be distributed to incrementally enrich the air fuel mixture to the remaining power mode CPCPUs to increase their respective power by 2.7% (13%/7) each. Thus, a lack of knock signal or other sensor signals from the malfunctioning CPCPU would trigger the control system to increase fuel to the remaining CPCPUs by approximately 2.7% (or the stoiciometric proportion) automatically mitigating for the malfunction reducing engine power. The control system would direct additional compressed air to be metered through the power mode cylinder associated ECCAIVs to increase air to stoiciometric proportions and hence the component failure in a CPCPU does not increase pollutant emissions while maintaining same power levels. Alternatively, the malfunctioning cylinder unit could still function in compressed air power mode or other non fuel power modes. Of course, some components are totally CPCPU debilitating, and perhaps a designed reliability in critical path component reliability would lead to even more reliable internal combustion engines.

Smart Engine Control in Common Mode Failure Mitigation

A fair percentage of vehicles, from a variety of causes, undergo loss of engine coolant at a time and place where they cannot quickly cool down the engine with external coolant. Depending on the severity of the leak and coolant rate of loss, residual engine heat and added engine heat from fuel burn heat, the engine temperatures can increase to levels sufficient to crack engine cylinder heads, block or worse. In scenarios such as these, a DRIC engine, with a reservoir of cool compressed air directed under a smart engine control system to shift into Compressed Air Idle Mode would cool down the cylinders and cylinder heads with compressed air, absorbing the residual engine heat to further expand the compressed air for additional effective piston pressure, in a compressed air mode providing continuing vehicle locamotion while allowing engine cooling directly at the source of peak engine temperature, the cylinders. In an embodiment of the invention, this would be accomplished by ceasesion of fuel and spark to CPCPUs, disengagement of power mode and engagement of Compressed Air Idle Mode, and operatively opening and closing inlet valve and exaust valves to take in compressed air for vehicle propulsion towards repair location and coolant while simulaneously reducing peak engine temperatures. Depending on engine temperature rise, alternate Power Mode and Compression Mode in mixed mode may also be executed.

Although gasoline and diesel fuels are mentioned in some invention embodiments, the invention is equally applicable to hydrogen and other combustable fuel engines. While this invention has been described and illustrated with reference to particular embodiments, it will be readily apparent to those skilled in the art that the scope of the present invention is not limited to the disclosed embodiments but, on the contrary, is intended to cover numerous other modifications, alterations, adaptions and equivalent arrangements may be made by those skilled in the art without departing from the spirit and scope of the invention.

What is claimed is:

1. A method of dynamically re-configuring an internal combustion engine coupled to operation of a vehicle, the internal combustion engine being operable in a plurality of modes, the method comprising:

electronically controlling one or more cylinder unit associated valve, fuel injection and fuel ignition component states;

electronically synchronizing cylinder unit piston position with cylinder unit associated component states to create selected cylinder unit strokes;

embodying sequences of strokes defining a plurality of modes into computer readable program logic in computer usable medium;

embodying computer readable program logic in computer usable medium to determine engine operation requirements based in part on sensed signals and vehicle operational parameters;

selecting cylinder unit operating modes based in part on the determined engine operation requirements and program logic; and configuring cylinder unit component states based in part on the selected sequence of cylinder unit strokes in accordance with the computer programmed selected mode of operation.

2. The method according to claim 1, wherein determining the engine operation mode comprises the steps of:

determining if the vehicle engine is on, and if not, then selecting Compression Start Mode if there is sufficient available source of compressed air, and alternatively executing a battery engine start;

determining the vehicle power requirements from real-time vehicle operating parameters and selecting engine Power Mode and alternatively, Boost Power Mode if the magnitude of the vehicle power requirement exceeds a given threshold and there is sufficient available source of compressed air to provide the required engine power;

determining the vehicle braking requirements from real-time vehicle operating parameters and selecting Re-Generative Compression Braking Mode operation if there is available compressed air storage capacity and alternatively, Compression Braking Mode, to provide the required engine braking power;

determining if the vehicle is required to be in hot standby and selecting Compressed Air Idle Mode if there is sufficient available source of compressed air and alternatively, Power Mode, to provide engine idling; and systematically and continuously cycling through the comprised steps until an engine stop signal is received.

3. The method according to claim 1, further selecting from a plurality of modes whether the engine Compressed Air Production Mode is required comprises the steps of:

determining if the vehicle engine is on, and if not, then selecting Compression Start Mode if there is sufficient available source of compressed air and alternatively, a battery powered start;

determining if the engine must provide a source of compressed air for standalone application and selecting Compressed Air Production Mode until standalone application stop signal is received.

4. The method according to claim 1, wherein operation of Power Mode for a specified cylinder unit comprises the steps of:

determining engine speed required;

determining engine crankshaft position;

determining cylinder unit component state timing and duration from programmable logic for the power mode stroke sequence;

determining the cylinder unit inlet valve opening time and duration from engine parameters for the stroke sequence;

determining the cylinder unit exhaust valve opening time and duration from engine parameters for the stroke sequence;

determining the cylinder unit fuel injection time and duration for the engine speed required;

determining the cylinder unit fuel mixture ignition time and composition based on power stroke timing and engine speed requirements; and sending output signals to cylinder unit components in accordance with determined timing and duration of component states for the intake, compression, power and exhaust stroke sequence.

5. The method according to claim 1, wherein a compressed air storage reservoir allows operation of, but not limited to, programmed modes of operation such as Regenerative Compression Brake Mode, Compressed Air Start Mode, Compressed Air Idle Mode, Boost Power Mode and Compressed Air Production Mode, comprising the steps of:

configuring one or more cylinder units to set component states in concert with a programmed sequence of strokes to expel compressed air from cylinder units to a compressed air storage reservoir; and configuring one or more cylinder units to set component states in concert with a programmed sequence of strokes to received metered compressed air from a compressed air storage reservoir;

whereby programmed modes of engine operation which expel and receive compressed air have a respective storage and supply of compressed air.

6. The method according to claim 1, wherein the engine cylinder unit programmably alterable firing order comprises the steps of:

determining power requirements;

determining the cylinder units selected for power mode and boost power mode based partly on vehicle operating parameters; and configuring cylinder unit operation by executing programmed logic defining power mode and boost mode cylinder unit component states with respect to selected stroke sequences;

wherein the firing order of the engine cylinder units which are programmed for power mode and boost power are independently controlled in accordance with program logic and vehicle parameter input.

* * * * *